United States Patent
Cecil et al.

(10) Patent No.: US 12,242,183 B2
(45) Date of Patent: Mar. 4, 2025

(54) ENFORCING MASK SYNTHESIS CONSISTENCY ACROSS RANDOM AREAS OF INTEGRATED CIRCUIT CHIPS

(71) Applicant: Synopsys, Inc., Sunnyvale, CA (US)

(72) Inventors: Thomas Christopher Cecil, Menlo Park, CA (US); Kevin Hooker, Austin, TX (US)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 18/626,291

(22) Filed: Apr. 3, 2024

(65) Prior Publication Data
US 2024/0248392 A1    Jul. 25, 2024

Related U.S. Application Data

(62) Division of application No. 17/749,952, filed on May 20, 2022, now Pat. No. 11,977,327, which is a division of application No. 16/929,700, filed on Jul. 15, 2020, now Pat. No. 11,360,382.

(60) Provisional application No. 62/875,579, filed on Jul. 18, 2019.

(51) Int. Cl.
| | |
|---|---|
| *G06F 30/30* | (2020.01) |
| *G03F 1/36* | (2012.01) |
| *G03F 1/44* | (2012.01) |
| *G03F 1/70* | (2012.01) |
| *G06F 16/51* | (2019.01) |
| *G06F 30/392* | (2020.01) |
| *G06F 111/20* | (2020.01) |

(52) U.S. Cl.
CPC .............. *G03F 1/70* (2013.01); *G03F 1/36* (2013.01); *G03F 1/44* (2013.01); *G06F 16/51* (2019.01); *G06F 30/392* (2020.01); *G06F 2111/20* (2020.01)

(58) Field of Classification Search
CPC ..... G03F 1/70; G03F 1/36; G03F 1/44; G03F 1/78; G06F 16/51; G06F 30/392; G06F 2111/20; G06F 30/39
See application file for complete search history.

(56) References Cited

U.S. PATENT DOCUMENTS

| | | | | |
|---|---|---|---|---|
| 8,234,596 B2 * | 7/2012 | Ogawa | ...................... | G03F 1/36 716/54 |
| 8,307,310 B2 * | 11/2012 | Kotani | .................. | G06F 30/398 700/121 |
| 8,677,288 B2 * | 3/2014 | Vengertsev | ............... | G03F 1/36 716/53 |

(Continued)

*Primary Examiner* — Jack Chiang
*Assistant Examiner* — Brandon Bowers
(74) *Attorney, Agent, or Firm* — Fenwick & West LLP

(57) ABSTRACT

A system generates a mask for a circuit design while enforcing symmetry and consistency across random areas of the mask. The system builds a mask solutions database mapping circuit patterns to mask patterns. The system uses the mask solutions database to replace circuit patterns of the circuit design with mask patterns. The system identifies properties in circuit patterns of the circuit design and enforces the same property in the corresponding mask patterns. Examples of properties enforced include symmetry within circuit patterns and similarity across circuit patterns. The system combines mask patterns in different regions of the circuit and resolves conflicts that occur when there are multiple masks within a region.

20 Claims, 23 Drawing Sheets

(56) References Cited

U.S. PATENT DOCUMENTS

| | | | |
|---|---|---|---|
| 10,310,372 B1* | 6/2019 | Yenikaya | G03F 1/36 |
| 11,025,869 B2* | 6/2021 | Kwag | H04N 25/133 |
| 2004/0181767 A1* | 9/2004 | Soper | G03F 1/36 |
| | | | 716/53 |
| 2006/0129967 A1* | 6/2006 | Tanaka | G03F 1/68 |
| | | | 716/55 |
| 2007/0006115 A1* | 1/2007 | Nojima | G06F 30/398 |
| | | | 716/52 |
| 2015/0002852 A1* | 1/2015 | de Groot | G01B 9/0209 |
| | | | 356/450 |
| 2021/0018831 A1* | 1/2021 | Cecil | G06F 30/392 |

* cited by examiner

ENFORCING MASK SYNTHESIS CONSISTENCY ACROSS RANDOM AREAS OF INTEGRATED CIRCUIT CHIPS

CROSS REFERENCE TO RELATED APPLICATIONS

This application is a divisional of co-pending U.S. patent application Ser. No. 17/749,952, filed on May 20, 2022, which is a divisional of U.S. patent application Ser. No. 16/929,700, filed on Jul. 15, 2020, now issued as U.S. Pat. No. 11,360,382, which claims a benefit of U.S. Patent Application Ser. No. 62/875,579, filed Jul. 18, 2019, the contents of each of which is incorporated by reference herein.

TECHNICAL FIELD

This disclosure relates to the field of electronic design automation in general, and more specifically to mask synthesis for a full integrated circuit chip layout based on geometric design analysis.

BACKGROUND

Mask synthesis uses lithographic tools for performing full-chip optical proximity correction (OPC), inverse lithographic techniques (ILT), and process checking and analysis on integrated circuit layout patterns. As chip dimensions get smaller, the number of noise factors in the circuit design keeps increasing while error tolerance keeps decreasing. Different circuit patterns on the integrated circuit chip may have slight differences caused by noise factors. However, using separate masks for these circuit patterns increases the costs of mask synthesis solutions such as OPC, ILT, and model based assist features (MBAF). Asymmetry and inconsistency in mask synthesis solutions is undesirable in the chip fabrication process and contributes to the overall error as well as cost of manufacturing.

SUMMARY

Disclosed is a configuration (e.g., system, method, non-transitory computer readable storage medium storing instructions executable by a processor) for generating masks for a circuit design. A system, for example, a mask design system receives a circuit design for generating a mask. The system builds a mask solutions database that maps circuit patterns to mask patterns. The system identifies a set of unique circuit patterns within the circuit by placing a search window at different locations in the circuit design. The search window represents a bounding box placed at a location. The circuit pattern represents geometric shapes of the circuit design that occur within the bounding box of the search window. The system adds the circuit pattern to the set of unique circuit patterns if it is not already included in the set. The system generates mask patterns for the set of unique circuit patterns and stores them in the mask solutions database. Each mask pattern is indexed to the circuit pattern used to generate the mask pattern. For example, the system may generate a signature based on the geometric shapes within the circuit pattern and use the signature for indexing the mask pattern. The system generates a mask for the circuit design by using mask patterns stored in the mask solutions database for matching circuit patterns.

In an embodiment, the system receives a circuit design and a mask for the circuit design and enforces certain properties in the mask, for example, consistency and symmetry. The system identifies circuit patterns within the circuit design and mask patterns corresponding to the circuit patterns. The system determines a property of the circuit patterns based on the geometric shapes occurring with each circuit pattern. For example, the property may be a type of symmetry in a circuit pattern. Examples of different types of symmetry include rotation symmetry, mirror symmetry, translation symmetry, fractional pitch symmetry, or combinations of these. Alternatively, the property may indicate that the circuit patterns are similar to each other. The system modifies the mask patterns such that the modified one or more mask patterns have the same property as the corresponding circuit patterns. For example, if a circuit pattern has a particular type of symmetry, the system modifies the mask pattern to have the same symmetry. If the circuit patterns are similar to each other, the system replaces the mask patterns with mask patterns that are also similar to each other. In an embodiment, the system determines an aggregate mask pattern from the multiple mask patterns and uses the aggregate mask pattern instead of the individual mask patterns. The system replaces portions of the mask design using the modified mask patterns.

In one embodiment, the system receives a circuit design determines mask patterns for different overlapping regions of the circuit design. If there are multiple mask patterns determined for a region, the system resolves conflicts between the mask patterns. The system identifies a region within a circuit pattern. The system identifies multiple mask patterns for the region. At least some of the mask patterns are overlapping. A mask pattern uses a vector representation of geometric shapes. The system rasterizes each of the mask pattern for the region to generate an image mask representation of the mask pattern. The image mask representation includes pixel values. The system determines a weighted aggregate of the image mask representations to generate an aggregate image mask representation. The weighting is performed such that a pixel value closer to the center of the region is weighted higher than a pixel value far from the center of the region. The system generates a mask pattern from the aggregate image mask representation and modifies the mask design to use the generated mask pattern.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
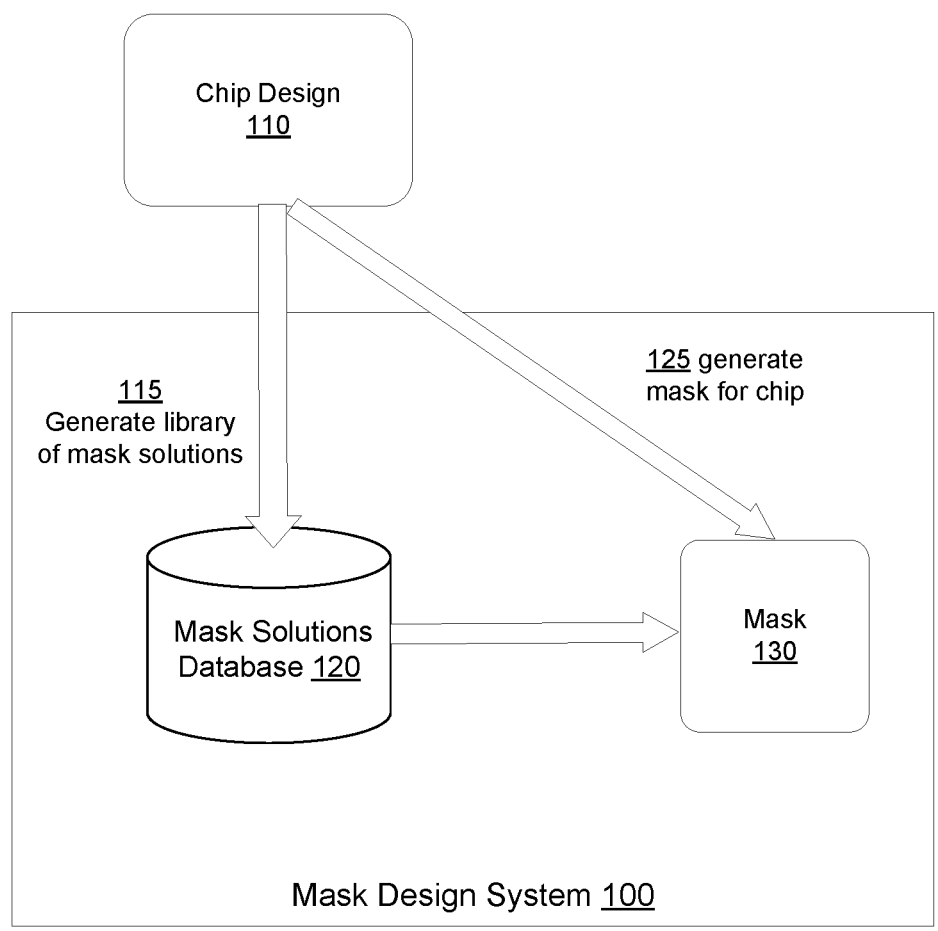
FIG. 1 illustrates the overall process of mask synthesis for a circuit design according to an embodiment.

The electronic design automation (EDA) process includes a tape-out stage that creates data to be used for production of lithography masks. During mask synthesis, the tape-out data is used to produce lithography masks that are used to produce finished integrated circuits. As chip dimensions are decreasing, simulations and mask synthesis techniques are becoming more complex and the number of noise factors is increasing while error budget is decreasing. Various noise factors in lithography simulations cause inconsistent and asymmetric mask synthesis solutions. These inconsistencies make the mask synthesis and chip fabrication process complex and expensive. Asymmetry in mask synthesis solutions is undesirable and contributes to the overall error budget in the chip fabrication process.

Lithography tools may enforce symmetry for repeated cells in a hierarchy of a hierarchical circuit design. For example, the tool may analyze the circuit design hierarchy to find periodically repeated cell structures and enforce symmetry within them. However, these tools are unable to identify symmetry across random areas which do not represent repeating cells in a hierarchical design. For example, these tools are unable to identify symmetry across circuit patterns that are made of portions of a circuit that are smaller than the smallest cell in the hierarchical circuit design or circuit patterns that span across multiple cells without overlapping with an entire cell of the hierarchy.

Embodiments enforce consistency and symmetry across random areas of the circuit design during mask synthesis. The system extracts unique circuit patterns from the circuit design and builds a mask solutions database that maps circuit patterns to mask patterns. The system identifies the set of unique circuit patterns by placing a search window at different locations in the circuit design. The system generates mask patterns for the set of unique circuit patterns and stores them in the mask solutions database. The system generates a mask for the circuit design using mask patterns stored in the mask solutions database.

In an embodiment, the system enforces certain properties in a mask based on corresponding properties in the circuit patterns. For example, the property may be a type of symmetry in a circuit pattern. Examples of different types of symmetry include rotation symmetry, mirror symmetry, translation symmetry, fractional pitch symmetry, or combinations of these. The system modifies the mask patterns to have the same property as the corresponding circuit patterns. The system replaces portions of the mask design using the modified mask patterns.

In one embodiment, the system identifies multiple mask patterns for a region of the circuit and resolves conflicts between the mask patterns to generate a mask for the circuit design. The system rasterizes each mask pattern for the region to generate an image mask representation of the mask pattern. The system determines a weighted aggregate of the image mask representations to generate an aggregate image mask representation. The system generates a mask pattern from the aggregate image mask representation and modifies the mask design to use the generated mask pattern.

These embodiments generate masks for a circuit design that are consistent and symmetric. The generated mask is sent for fabrication of circuits based on the circuit design. The system according to various embodiments guarantees identical masks when identical circuit patterns are found for a particular circuit design or across multiple circuit designs that share the mask solutions database. This improves the cost of the fabrication process. Embodiments also improve the computational efficiency of mask synthesis for a circuit design by reusing mask solutions for circuit patterns that were previously encountered. The computational effort to look up a circuit pattern in the mask solutions database is significantly less than the computational effort to generate the mask solutions since signature lookup in the mask solutions database is efficient. As a result, less computing resources (e.g., processor utilization) may be used to generate the masks.

Overall System Environment

FIG. 1 illustrates the overall process of mask synthesis for a circuit design according to an embodiment. A mask design system 100 receives a circuit design 110 as input. Various embodiments can have components different from those shown in FIG. 1 and described herein.

The mask synthesis system 100 extracts circuit patterns from the circuit by identifying repeated circuit design regions that are identical. The mask design system 100 generates mask patterns for these circuit patterns to generate 115 a library, for example, the mask solutions database 120. The mask design system 100 uses the library as a look up table for performing full chip mask synthesis to generate 125 the mask 130 for the circuit design 110.

The mask design system 100 creates a library of mask solutions for random circuit patterns across a particular circuit design or across multiple circuit designs. The mask design system 100 solves the consistency and symmetry problem by guaranteeing that any identical placements of design geometry result in identical masks and any design symmetry detected locally is enforced on the mask. This improves the chip fabrication process by reducing the sources of errors in the process.

Embodiments enforce symmetry across circuit patterns that are made of portions of a circuit that are smaller than the smallest cell in the hierarchical circuit design or circuit patterns that span across multiple cells without overlapping with an entire cell of the hierarchy. For example, a unique circuit pattern identified and processed for generating a mask pattern by embodiments may not have any identity as a cell in the hierarchical circuit design. Accordingly, embodiments enforce symmetry and consistency across circuit patterns that are sub-cell and non-hierarchical.

Architecture of Layout Classification System

Figure 2:
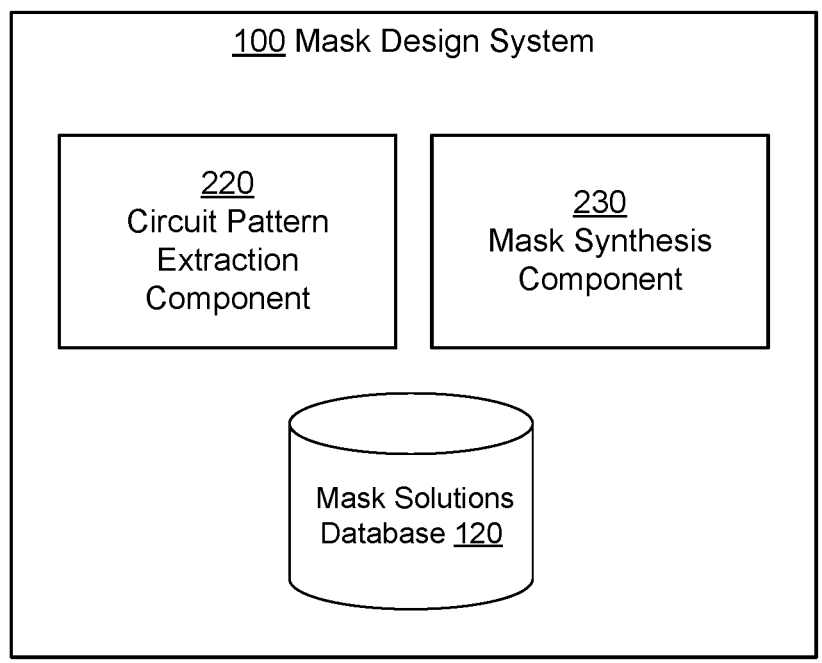
FIG. 2 shows a block diagram of a system architecture of a mask synthesis system according to an embodiment.

FIG. 2 shows a block diagram of a system architecture of a mask synthesis system according to an embodiment. The mask design system 100 includes a circuit pattern extraction component 220, a mask synthesis component 230, a circuit dictionary 240, and a mask solution database 120. Other embodiments may include more or fewer components than those indicated herein. Functionality indicated herein as being performed by a particular module may be performed by other modules than those indicated herein.

The circuit pattern extraction module 220 extracts a set of circuit patterns from a representation circuit design, for example, a representation of layout of a physical design of a circuit. The circuit pattern dictionary 240 maps each circuit pattern to a unique identifier that can be used to look up the circuit pattern, for example, a hash key. The circuit pattern extraction module 220 stores the circuit patterns in the mask solutions database 120. In an embodiment, the representation of the circuit design processed by the mask design system 100 is based on Graphic Design System (GDS) format, for example, GDSII format or the Open Artwork System Interchange Standard (OASIS) format. Other embodiments can use any format for representing the circuit design.

The mask synthesis component 230 generates a mask solutions database 120 by generating mask solutions for the circuit patterns stored in the circuit pattern dictionary 240. The mask synthesis component 230 also processes the input circuit design with the help of the mask solution database 120 to generate a mask for the circuit.

The mask solutions database 120 stores mask solutions for circuit patterns. The mask solutions database 120 may index the mask solutions to signature values corresponding to circuit patterns, for example, a geometric hash key obtained from the geometry of the circuit pattern. In some embodiments, the mask solutions database 120 stores mask solutions for circuit patterns obtained from the circuit for which the mask is being generated. In other embodiments, the mask solutions database 120 stores mask solutions for circuit patterns obtained from multiple circuits and acts as a library that can be used across circuits designs.

In some embodiments, the mask design system 100 is implemented as a distributed system with multiple computer processors that process different portions of a circuit design in parallel. For example, the mask design system 100 may extract the circuit patterns from different portions of the circuit in parallel and the mask synthesis component 230 may generate mask for different portions of the circuit in parallel.

The various processes executed by the components of the mask design system 100 are described in detail below.

Overall Process of Mask Synthesis of a Circuit Design

Figure 3:
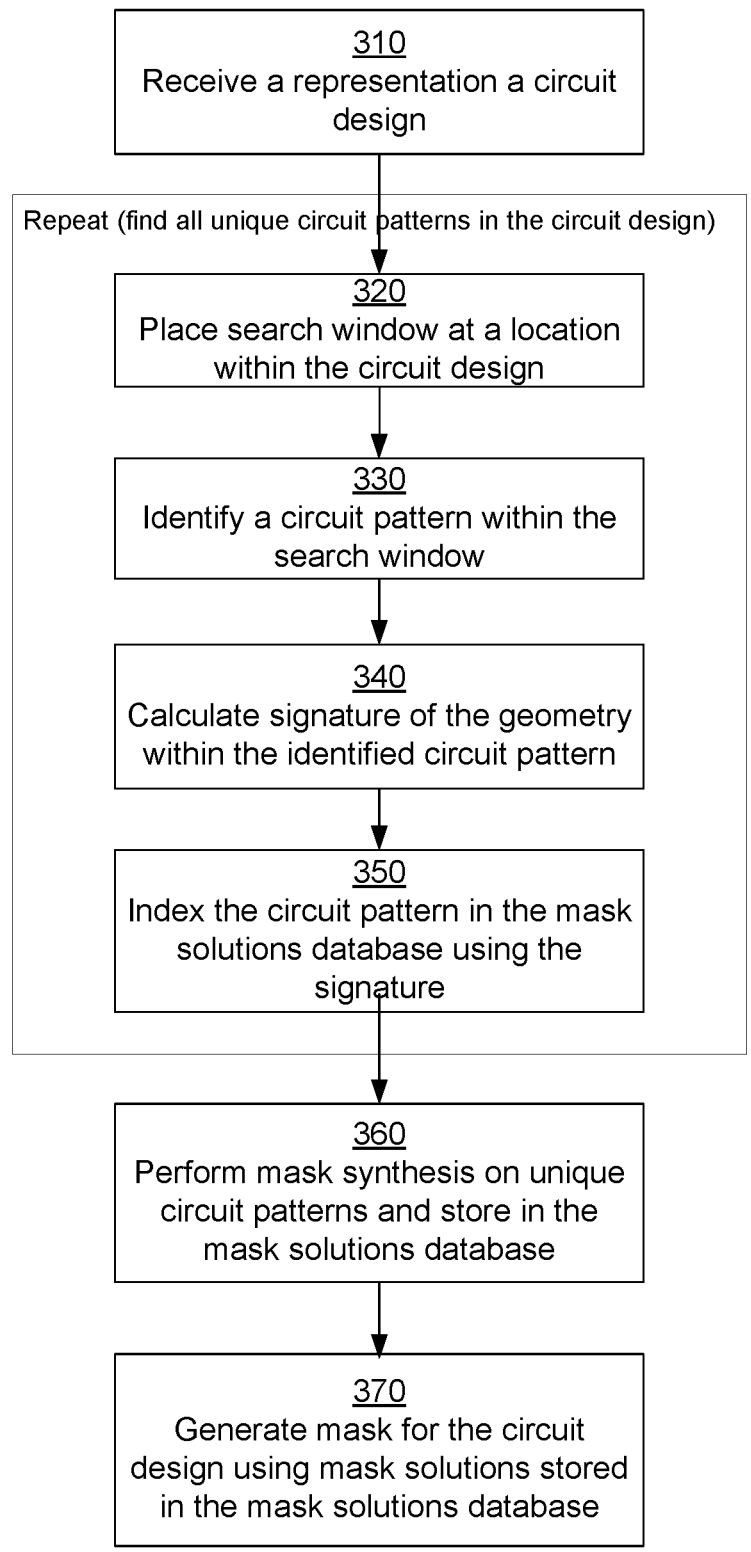
FIG. 3 depicts a flowchart of the process for performing mask synthesis of a circuit design according to an embodiment.

FIG. 3 depicts a flowchart of the process for performing mask synthesis of a circuit design according to an embodiment. The steps shown in the flowchart of FIG. 3 may be performed in an order different from that indicated in the flowchart. For example, certain steps may be performed in parallel with other steps. Furthermore, various steps shown in the flowchart may be performed using a parallel or distributed system.

The mask design system 100 receives 310 a representation of a circuit design. The circuit design may represent a full chip design or representative set of test patterns. The mask design system 100 finds unique circuit patterns in the circuit design by repeatedly performing the steps 320, 330, 340, and 350.

The mask design system 100 places 320 a search window at different locations within the circuit design. The search window represents a bounding box placed at a location within the circuit design. There may be one or more geometric shapes or portions of geometric shapes of the circuit design within the bounding box of the search location. The locations where the search window is placed may be selectively chosen using a circuit design hierarchy or by heuristically based sparse sampling of the circuit design to improve efficiency by reducing the number of locations processed without affecting the quality of result.

For each location, the mask design system 100 identifies 330 a circuit pattern by clipping 330 the circuit design to the search box. The circuit pattern includes a set of geometric shapes, for example, polygons. The mask design system 100 calculates 340 a signature of the circuit pattern, for example, a hash key such as a geometric hash key. The mask design system 100 may determine a geometric hash key by generating a mathematical representation of the circuit pattern and calculating a function based on the representation. For example, the mathematical representation of the geometry of the circuit pattern may include a set of values, for example, a set of vectors representing features in the geometry of the circuit pattern. The mask design system 100 applies a function to the set of values representing the geometry of the circuit pattern to generate a hash value that is used as the signature of the circuit pattern.

In an embodiment, the mask design system 100 uses a signature that maps variations of a circuit pattern to the same signature value if the variation can be obtained by rotation, translation, or taking a mirror image along an axis. The signature acts as an identifier for a circuit pattern that is invariant to certain types of transformations. In an embodiment, the mask design system 100 takes a circuit pattern and performs different transformations on the circuit pattern including rotation, translation, or mirroring and determines a signature value for each transformed circuit pattern. The mask design system 100 uses certain criteria for consistently selecting a signature value from the set of signature values obtained. For example, the mask design system 100 may generate a hash key for each of the set of values to generate a set of hash key values and select the hash key with the smallest value from the generated set of hash keys.

The mask design system 100 uses the signature value to index 350 the circuit pattern into a dictionary that stores the circuit patterns. In an embodiment, the dictionary is the mask solutions database 120.

The mask design system 100 performs 360 mask synthesis on circuit patterns from the set of unique circuit patterns to generate a mask pattern corresponding to each unique circuit pattern. The mask design system 100 stores the mask patterns for the set of unique circuit patterns in the mask solutions database 120.

The mask design system 100 performs 370 generates 370 the mask for the circuit design by using the stored mask solutions of the circuit patterns. When performing mask synthesis on the input circuit design or a new circuit design, the mask design system 100 uses the same searching/hashing technique to find circuit patterns that have mask solutions stored in the mask solutions database 120. The mask design system 100 places the mask patterns into those locations in the circuit design as appropriate. The mask design system 100 performs blending of mask solutions to produce a lithographically optimized mask. Details of the blending process are further described herein.

According to various embodiments, different steps of the process illustrated in FIG. 3 may be executed using multiple processors, for example, using a distributed architecture. The steps 320, 330, 340, 350 may be executed in parallel for different portions of the circuit. For example, one processor may identify unique patterns in one portion of the circuit design and another processor may identify unique patterns in another portion of the circuit design. Similarly, the step 360 may be performed using multiple processors, each processor performing 360 mask synthesis for one or more circuit partitions. Similarly, the step 370 may be performed using multiple processors, each processor performing mask synthesis for a portion of the circuit design. Accordingly, a large circuit design may be split across a large number of processors to speed up the execution of the process.

Identification of Unique Patterns

Figure 4:
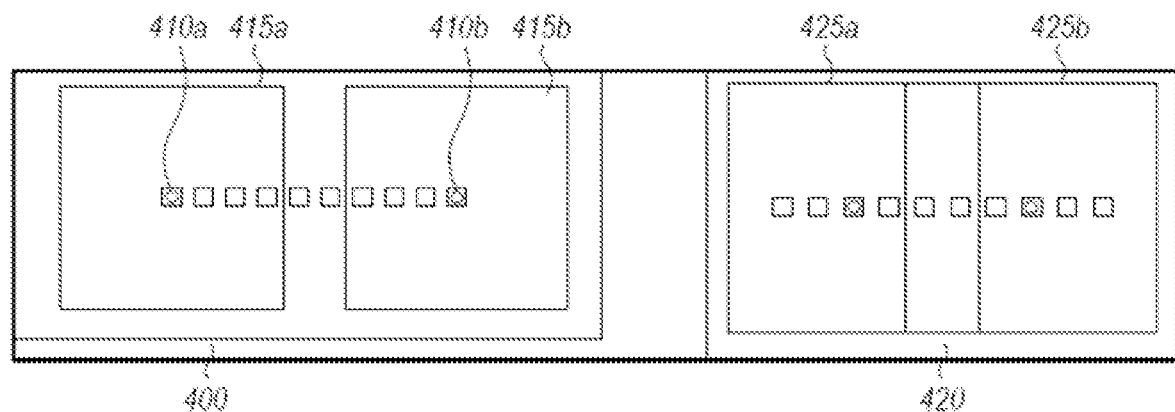
FIG. 4 shows an example search window for identifying circuit patterns in a circuit design, according to an embodiment.
Figure 5:
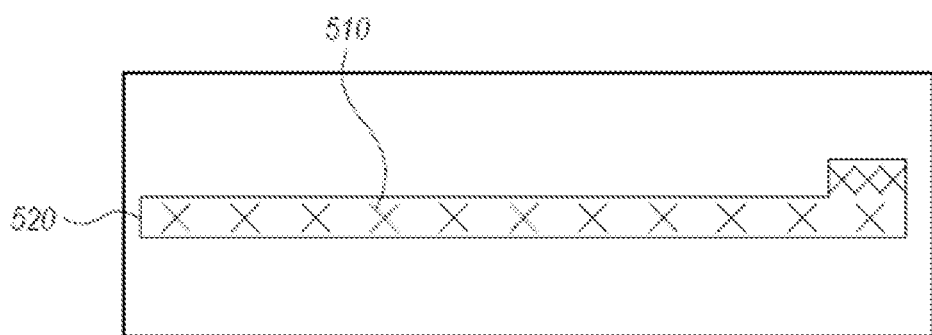
FIG. 5 shows an example search window for identifying in another example circuit, according to an embodiment.
Figure 6:
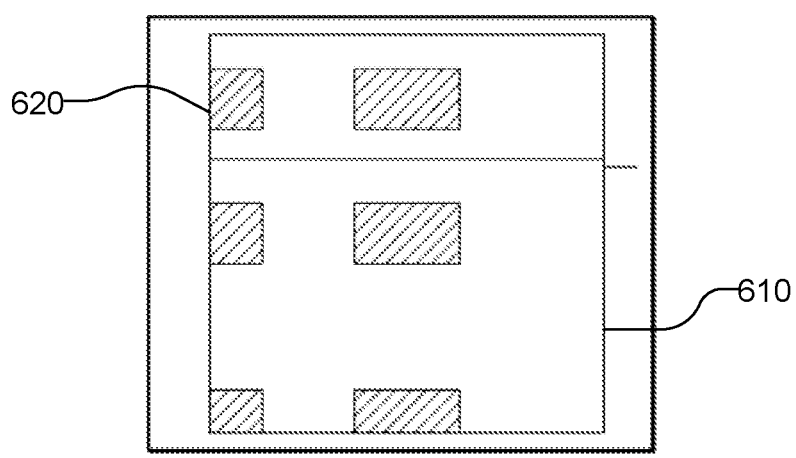
FIG. 6 shows a circuit pattern based on placement of the search window according to an embodiment.

FIG. 4-6 illustrates selection of locations for placing the search box within the circuit design. Some embodiments use heuristics based on user expertise to identify relevant locations which are likely be centers of repeated patterns and therefore suitable for identifying unique circuit patterns.

FIG. 4 shows an example search window for identifying circuit patterns in a circuit design, according to an embodiment. More specifically, FIG. 4 shows how the search window is used to identify circuit patterns for a contact layer of the circuit design. The mask design system 100 places the search window 410 at a location centered at the center of a contact in the contact layer.

As illustrated in FIG. 4, the circuit has an array of contacts 410. For the portion of circuit 400 shown on the left in FIG. 4, the mask design system 100 searches at the outermost contact. The search windows 415 are centered at the dots 410 representing a center of a contact.

The portion of circuit 420 shown on the right illustrates overlapping search boxes 425. This overlap illustrates that when the mask design system 100 inserts the mask solution in the database for these locations, the mask design system 100 also handles the region where the search boxes overlap as further described herein.

FIG. 5 illustrates placing the search window to identify circuit patterns for a layer of the circuit using another example circuit, according to an embodiment. For longer shapes, the mask design system 100 divides the shape into smaller fragments and uses the fragments as search box centers as is shown in FIG. 5 where the X's 510 indicate the search box centers within a longer polygon 520.

The mask design system 100 identifies the search window centers, and thus places the search window on the location represented by the search window center. The search window represents a bounding box centered at the location represented by the search window center. The mask design system 100 clips the geometry of the circuit design to each of these bounding boxes represented by the search windows to determine a circuit pattern representing the portion of the circuit design that occurs within the search window. The mask design system 100 computes a unique identifier such as a geometric hash key based on the geometric shapes that occur within the circuit pattern. The mask design system 100 uses the geometric hash key as a compact identifier for each clipped geometry which can be compared against other clipped geometries to see if they are identical. In an embodiment, the hash key is some mathematical function of the geometry's vertex locations.

FIG. 6 shows a circuit pattern based on placement of the search window 610 according to an embodiment. In an embodiment, the mask design system 100 selects the window size as a function of some physical model parameters such as the wavelength of the scanner laser and the numerical aperture of the scanner system. For example, the mask design system 100 may select the window size as a linear function with a scaling factor applied to the wavelength of the scanner laser or the numerical aperture of the scanner system. The clipped geometry that includes polygons 620 represents a circuit pattern that may be stored in the mask solutions database 120.

For each circuit pattern the mask design system 100 stores the hash key for the circuit pattern in the mask solution database 120. The mask solution database 120 allows the system to identify which circuit patterns are present in different locations of the chip and thus identify the unique set of circuit patterns in the circuit design.

The mask design system 100 checks for all possible geometric transformations including rotations, translations, and mirroring of the patterns so that a single master version of each circuit pattern is stored. In an embodiment, the mask design system 100 stores the single master version by storing the circuit pattern with the lowest hash key of all possible geometric transformations on it. This ensures that any transformed version of the circuit pattern will map to the same mask pattern.

Creation of Mask Solution

For this step the mask design system 100 creates the mask solutions for the circuit patterns. Following are two embodiments of methods for generating mask solutions for a circuit design. In the first embodiment (M1), the mask design system 100 generates the mask solution for the circuit design for the full chip and then modifies the generated mask solutions to make them symmetric and consistent across the chip. For example, the mask design system 100 may aggregates mask solutions for similar circuit patterns. In the second embodiment (M2), the mask design system 100 identifies all the unique circuit patterns first and then generates mask solutions for each unique circuit pattern. The mask design system 100 uses these mask patterns to generate the mask solution for the circuit design for the full chip.

The mask design system 100 may determine which embodiment to use, i.e., M1 or M2 based on various factors, for example, the number of circuit patterns relative to the size of the chip area. The mask design system 100 may determine that if there are more than a threshold number of unique circuit patterns in the chip, the mask design system 100 selects the first embodiment (M1) above. This happens for circuits that have many circuit patterns near each other with overlapping search boxes. In this case the first embodiment M1 above is expected to run faster than the second embodiment M2. However, if the number of unique circuit patterns is below a threshold value, the mask design system 100 selects the second embodiment M2 since that embodiment is expected to run faster.

Once all the solutions are created, the mask design system 100 may enforce symmetry within each circuit pattern depending on the symmetry of the design within the circuit pattern. The different types of symmetry considered by the mask design system 100 include mirror, translation, rotation, and hierarchical combinations of these type of symmetries. The mask design system 100 detects these symmetries within each circuit pattern and enforces the same symmetry on the mask patterns within each circuit pattern. Accordingly, if there is certain type of symmetry present in the circuit pattern, the mask design system 100 ensures that the corresponding mask also has the same symmetry. For example, if mask design system 100 determines that the circuit pattern has symmetry along X axis, the mask design system 100 ensures that the corresponding mask has symmetry along the X-axis. If mask design system 100 determines that the circuit pattern has symmetry along Y axis, the mask design system 100 ensures that the corresponding mask pattern has symmetry along the Y-axis. If the mask design system 100 determines that a portion of the circuit pattern can be obtained by rotation of another portion of the circuit pattern, the mask design system 100 ensures that the corresponding mask pattern has the same symmetry property and the corresponding portion of the mask pattern can be obtained by the same rotation of another corresponding portion of the mask pattern.

Figure 7:
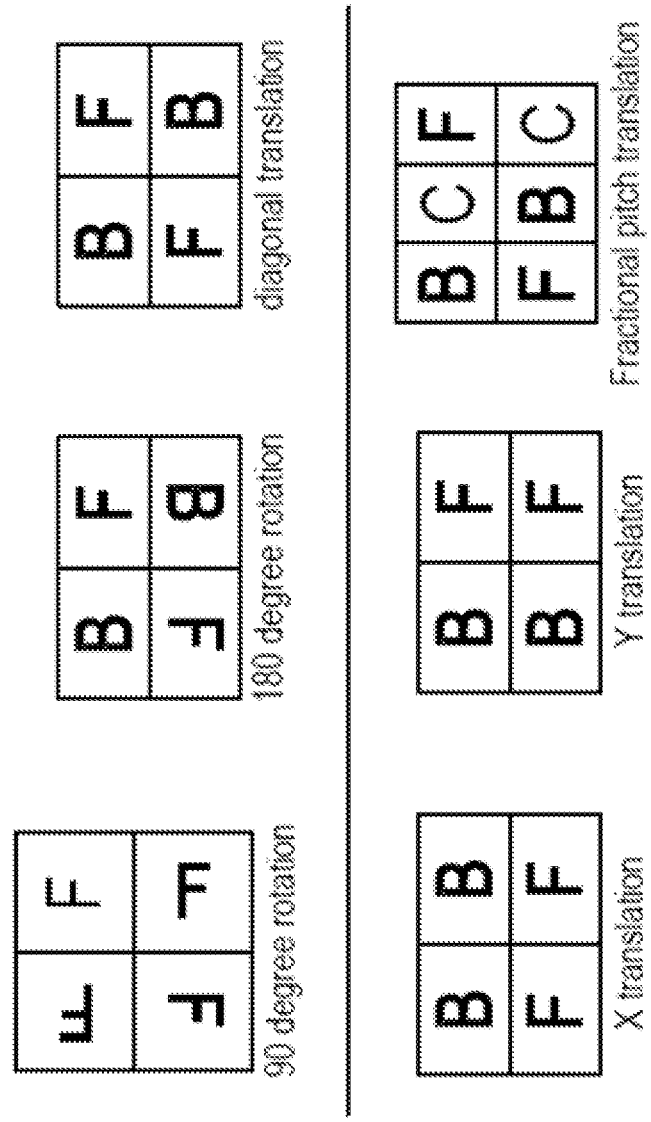
FIG. 7 depicts multiple types of symmetries which are detected and enforced by the mask design system on the mask patterns within each circuit pattern.

FIG. 7 depicts multiple types of symmetries which are detected and enforced by the mask design system 100 on the mask patterns within each circuit pattern. These include mirror, translation, rotation and hierarchical combinations of these types of symmetries. Examples of rotation illustrated in FIG. 7 include 90 degree rotation and 180 degree rotation. Examples of translation illustrated in FIG. 7 include (1) diagonal translation in which a portion of the circuit pattern is repeated at a location obtained by diagonal translation, (2) X translation in which a portion of the circuit pattern is repeated at a location obtained by translation along X axis, (3) Y translation in which a portion of the circuit pattern is repeated at a location obtained by translation along Y axis, and (4) fractional pitch translation in which two portions of the circuit pattern can be matched by translating their sub-portions appropriately.

Figure 8A:
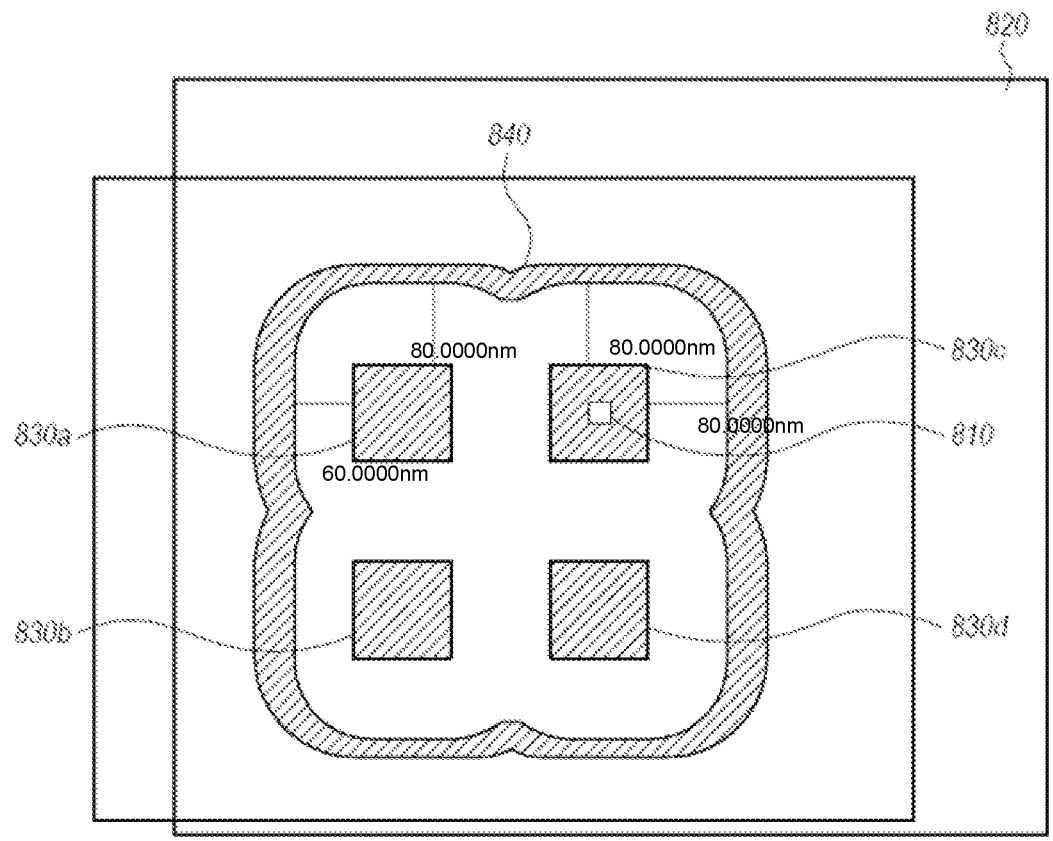
FIG. 8A shows an example of a pattern centered at the dot with clip window shown by the outer box according to an embodiment.

FIG. 8A shows an example of a circuit pattern according to an embodiment. The circuit pattern is centered at the dot 810 with the search window 820 shown by the outer box. The circuit pattern is represented the four squares 830*a*, 830*b*, 830*c*, and 830*d* in the center of the image, and the mask pattern is the rounded shape 840 surrounding the circuit pattern. The mask may be non-symmetric across certain axes. The mask design system 100 determines that the circuit pattern has mirror symmetry along the diagonal and therefore enforces corresponding diagonal symmetry on the mask pattern.

In one embodiment, the mask design system 100 uses method M1 above to generate a mask for the entire chip and identifies multiple instances of a circuit pattern in the circuit design that have mask patterns that have slight differences. The mask design system 100 combines these mask patterns to generate a single mask pattern that is used for all these similar circuit patterns. The mask design system 100 may combine mask patterns using various techniques, for example, by computing an average mask pattern as further described herein. Alternatively, the mask design system 100 selects the best mask pattern based on some lithographic performance of the mask pattern, for example, the mask pattern with the best process window, edge placement error, etc. The mask design system 100 may select the best mask pattern by determining a weighted aggregate of various factors and selecting the mask pattern that gets the highest weight, or by selecting the mask pattern which gives the best lithographic performance.

Enforcing Consistency and Symmetry in a Mask

In an embodiment, the mask design system 100 enforces consistency and symmetry across a mask design generated from a circuit design, for example, using method M1 described herein. The mask design system 100 receives a circuit design as input and generates a mask design for the circuit design. The mask design system 100 identifies one or more circuit patterns within the circuit design. The mask design system 100 determines mask patterns corresponding to each of the identified circuit patterns. The mask design system 100 determines a property of the one circuit patterns based on the geometric shapes within the circuit patterns. For example, the circuit patterns may be determined to be similar to each other or the circuit patterns may be certain type of symmetry. The mask design system 100 modifies the mask patterns such that the modified mask pattern has the same property as the circuit patterns. For example, if a circuit pattern is determined to have certain type of symmetry, the mask design system 100 modifies the mask patterns to have the same symmetry. If a set of circuit patterns are similar, the mask design system 100 ensures that the corresponding mask patterns are also similar or identical. The mask design system 100 replaces portions of the mask for the circuit design using the modified mask pattern. This makes various portions of the mask consistent and symmetric compared to the original mask.

Figure 9:
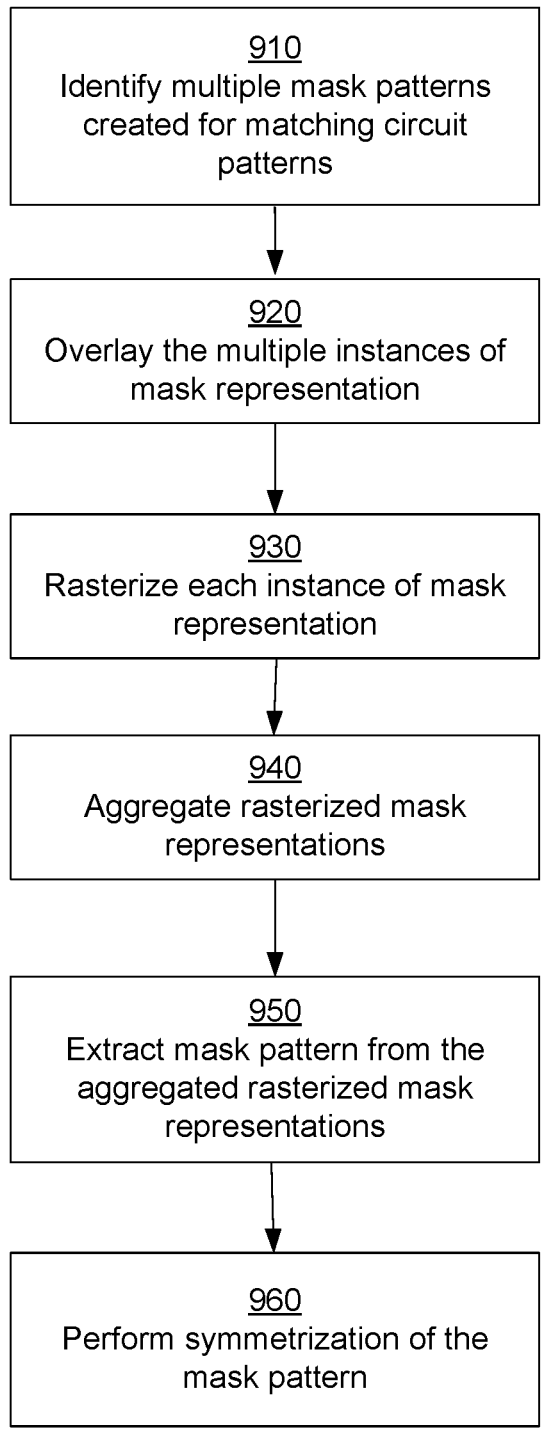
FIG. 9 shows a flowchart illustrating the process for generating a mask from multiple overlapping mask patterns according to an embodiment.

FIG. 9 shows a flowchart illustrating the process for generating a mask from multiple overlapping mask patterns according to an embodiment. The mask design system 100 identifies 910 one or more mask patterns for corresponding matching circuit patterns. These circuit patterns are determined to be similar to each other. For example, the mask design system 100 may determine a similarity score based on matching of the geometric shapes of circuit patterns. The mask design system 100 determines two circuit patterns are similar to each other if their similarity score is greater than a threshold value.

Figure 8B:
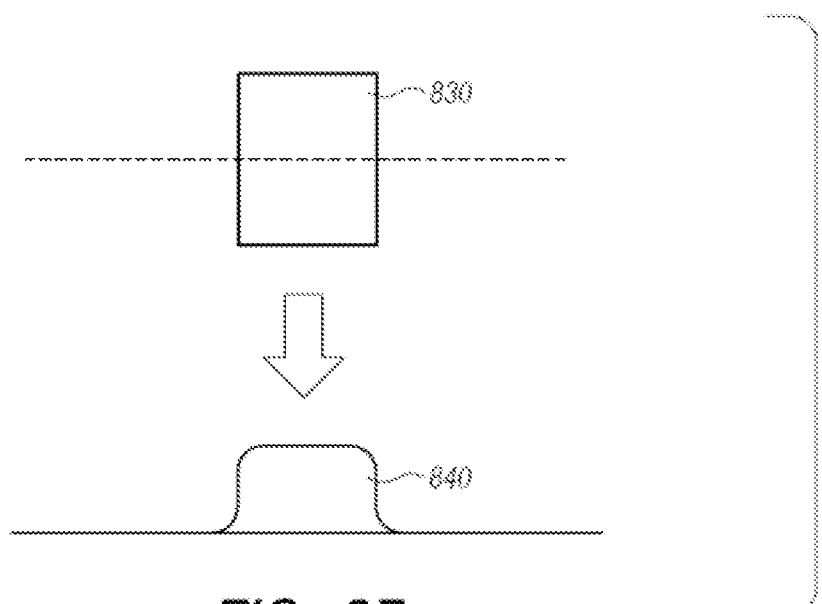
FIG. 8B shows the rasterization step, a transformation from the mask representation as polygons to a grid based representation, of the algorithm to produce an averaged solution according to an embodiment.

The mask design system 100 overlays 920 the identified mask patterns. The mask design system 100 rasterizes 930 each mask pattern, i.e., convert a mask pattern from a vector representation to a rasterized mask representation for the mask pattern. For example, the rasterized mask representation may be a pixelated mask representation such as a bit map representation, for example, as shown in FIG. 8B. FIG. 8B shows a mask polygon rectangle 830 and a one-dimensional cutline 840 of the rasterization, i.e., a cross section of a model in which the depth of the layer depends on the pixel value at that location.

Figure 10A:
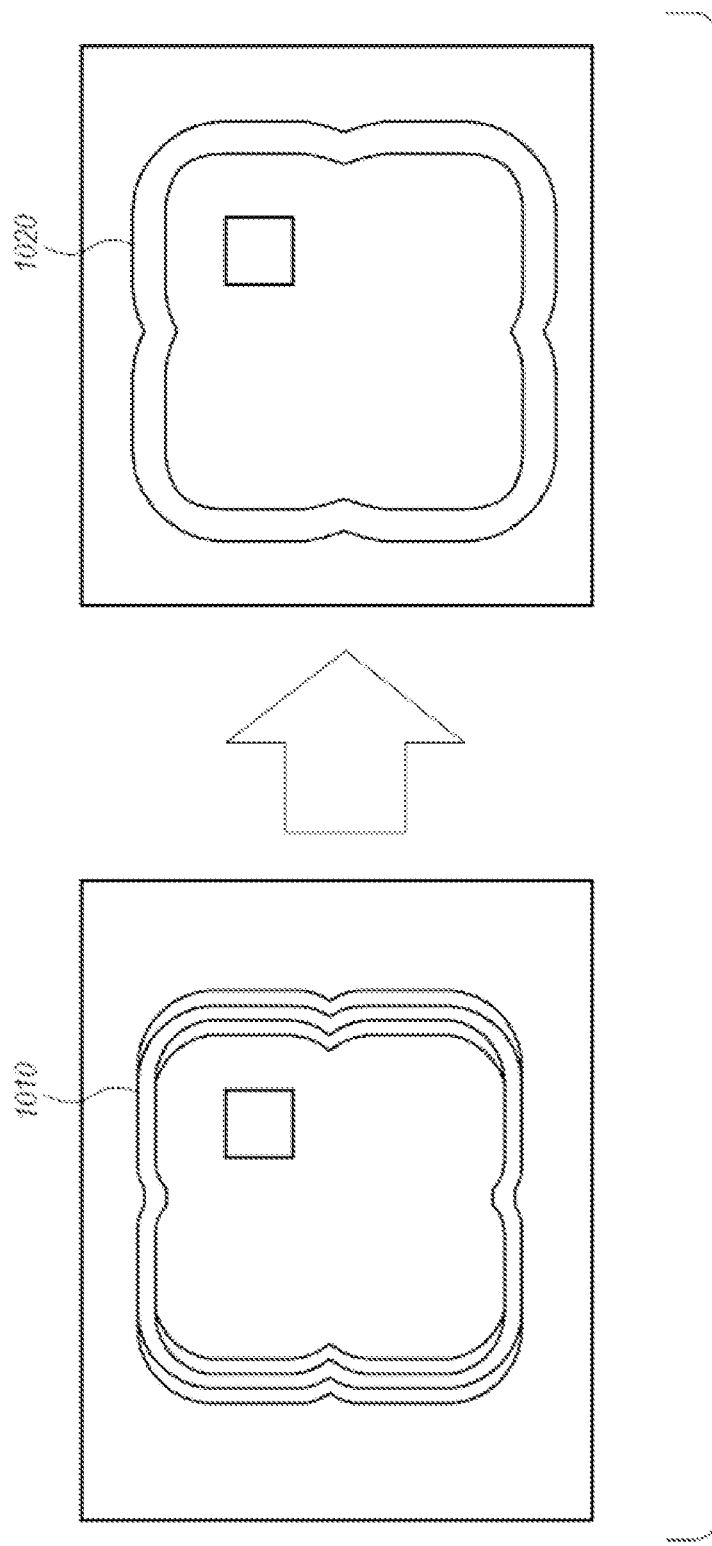
FIG. 10A shows an example symmetrized mask pattern obtained from a set of similar mask patterns, according to an embodiment.

The mask design system 100 aggregates 940 the rasterized mask representations. The mask design system 100 may aggregate the rasterized mask representations by averaging corresponding pixel values in the rasterized mask representations. Alternatively, the mask design system 100 may aggregate the rasterized mask representations by selecting one of the rasterized mask representations using certain criteria. For example, the mask design system 100 may select the rasterized mask representations that provides the best lithographic results. Aggregation 940 of the mask representations is illustrated in FIGS. 10A and 10B and described in connection with FIGS. 10A and 10B.

The mask design system 100 extracts 950 a mask pattern from the aggregated rasterized mask representation by converting the aggregated rasterized mask representation to a vector representation. The mask design system 100 performs symmetrization of the mask pattern. Accordingly, the mask design system 100 determines whether there is symmetry in the circuit pattern. If there is symmetry in the mask pattern, the mask design system 100 generates a mask pattern having corresponding symmetry. FIG. 10A shows an example symmetrized mask pattern 1020 obtained from a set of similar mask patterns 1010, according to an embodiment.

Figure 10B:
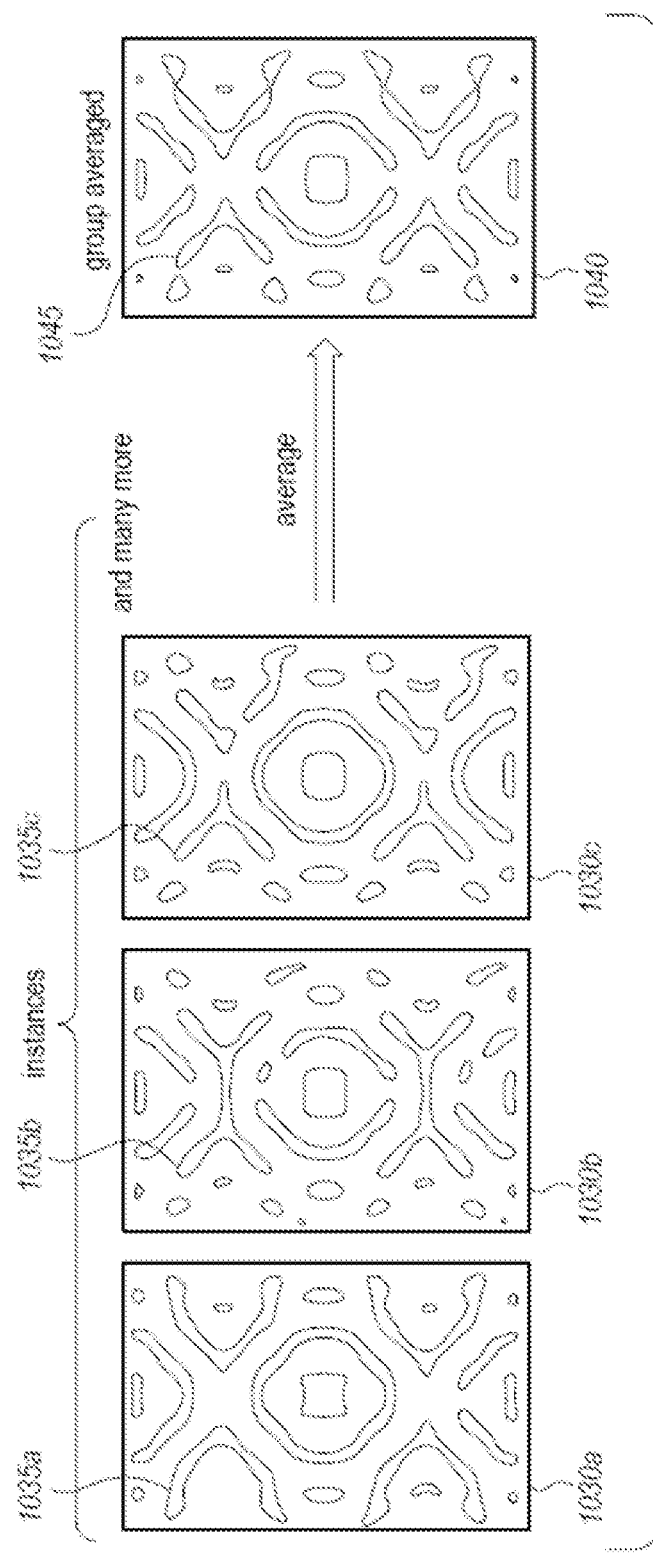
FIG. 10B illustrates a set of mask patterns with small inconsistencies combined to obtain an averaged solution according to an embodiment.

FIG. 10B illustrates a set of non-overlaid mask patterns with small inconsistencies combined to obtain an averaged solution according to an embodiment. The mask design system 100 processes the different mask patterns 1030*a*, 1030*b*, 1030*c*, and so on obtained from corresponding set of matching circuit patterns to generate an aggregate mask solution 1040. FIG. 10B illustrates averaging as the aggregating procedure. For example, the masks 1030 have differences as illustrated in the portions 1035*a*, 1035*b*, and 1035*c*. The portion 1045 is obtained by averaging the corresponding portions 1035*a*, 1035*b*, and 1035*c*.

As shown in FIG. 10B there are small inconsistencies 1035*a*, 1035*b*, and 1035*c* between the different mask patterns that from ILT (Inverse Lithography Technology) solutions. The mask design system 100 performs aggregation to remove these inconsistencies, so that the resulting mask pattern 1040 is same for all these instances 1030*a*, 1030*b*, 1030*c*.

In the case where larger differences in the mask need to be resolved, and averaging may yield an inferior lithographic solution, the mask design system 100 checks the lithographic performance of the averaged solution versus the individual mask solutions to determine if the degradation from averaging is too significant, for example, above a threshold value. If the mask design system 100 determines that the degradation is too significant, the mask design system 100 may use a lithographic based selection method that selects the mask pattern that has the best lithographic performance. The mask design system 100 may use a combination of spatial averaging and lithographic performance selection/weighting to generate the combined mask.

For method M1 aggregating mask patterns by averaging, using best lithographic result, etc. produce a single consistent and symmetrized mask pattern. For method M2 the mask synthesis system 100 runs the mask synthesis method, for example, ILT, to produce a single solution. Once these solutions are created, the mask synthesis system 100 postprocesses the mask to enforce any symmetry that is present within the local design geometry on the mask itself. For example, there is both X and Y mirror symmetry within the circuit pattern in FIG. 10B. The mask design system 100 enforces the same symmetry on the final mask. Similarly, FIG. 10A shows an example, of a mask pattern in which the mask design system 100 enforces mirror symmetry along a diagonal axis running from bottom left to top right.

Figure 10C:
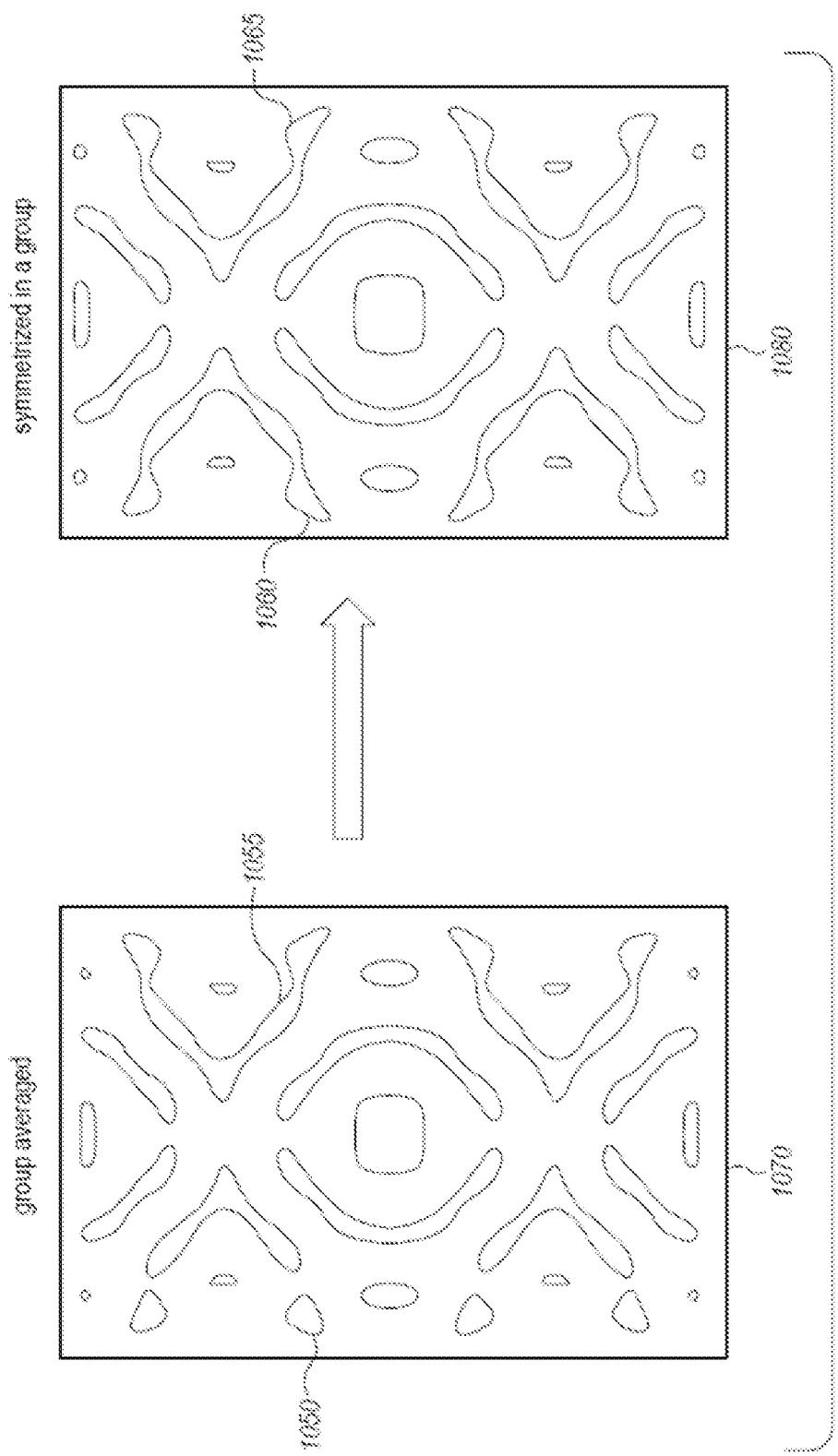
FIG. 10C illustrates an aggregated mask pattern and a symmetrized version of the mask pattern according to an embodiment.

FIG. 10C illustrates an aggregated mask pattern and a symmetrized version of the mask pattern according to an embodiment. There are inconsistencies between the top/bottom and left/right halves of the mask pattern 1070. The mask design system 100 modifies the mask pattern 1070 to obtain a symmetric mask pattern 1080. For example, the mask design system 100 identifies shapes 1050 and 1055 that represent inconsistencies in the symmetry along the Y axis. The mask design system 100 modifies the mask pattern 1070 to generate the symmetric mask pattern 1080 that has symmetry along the Y axis as shown by the modified shapes 1060 and 1065 that correspond to the shapes 1050 and 1055 respectively.

The mask design system 100 stores the mask patterns in the mask solutions database 120 for use replacing the mask patterns for the full circuit design, for example, in step 370 of the process illustrated in FIG. 3. In some embodiments the mask solutions database 120 operates offline, i.e., outside of any particular pass through the steps of the processes illustrated herein. This embodiment allows for consistency across chips as compared to just within-chip consistency.

Placement of the Mask Patterns in the Circuit Design Layout

Once the mask patterns have been created, the mask design system 100 replaces the mask patterns into the circuit layout in the locations where the corresponding circuit patterns are found. If multiple windows overlap as shown in FIG. 4, the mask design system 100 determines how to resolve conflicts resulting from differences in mask patterns at the same position in the circuit design. The overlapping portion of two mask patterns may have differences in the mask patterns based on the context within each mask pattern. The mask design system 100 determines the resulting mask for this shared portion when mask patterns are combined.

Two embodiments for combining mask patterns for a full circuit design are presented here. The first technique uses medial axes based mask placement that divides the circuit design into non-overlapping regions using Voronoi diagrams to avoid conflicts in mask patterns. The second technique uses blending based mask placement that smoothly combines overlapping mask patterns using rasterized representation of mask patterns.

Medial Axes Based Mask Placement

Figure 11:
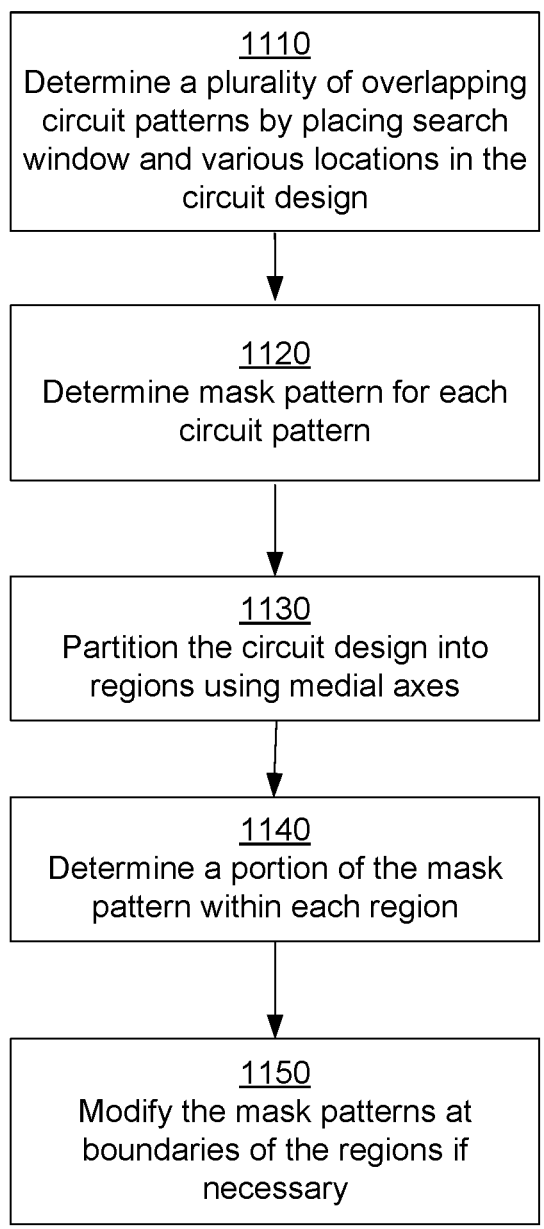
FIG. 11 shows a flowchart illustrating a process for replacing mask patterns for overlapping circuit patterns to obtain the combined mask pattern, according to an embodiment.

In this embodiment, the mask design system 100 uses a medial axis based mask placement method for combining mask patterns for a full circuit design that divides the circuit design to create non-overlapping regions. FIG. 11 shows a flowchart illustrating a process for replacing mask patterns for overlapping circuit patterns to obtain the combined mask pattern, according to an embodiment. The process is illustrated using the examples shown in FIGS. 12A and 12B.

The mask design system 100 determines 1110 multiple overlapping circuit patterns. Each circuit pattern is defined by placing the search window on a location in the circuit design. A circuit pattern includes a geometric shape, for example, a polygon. The circuit pattern may be defined using a search window that is placed a location that represents a point within the geometric shape, for example, the center of a polygon. If two polygons are located within a threshold distance of each other, the corresponding circuit patterns are overlapping.

Figure 12:
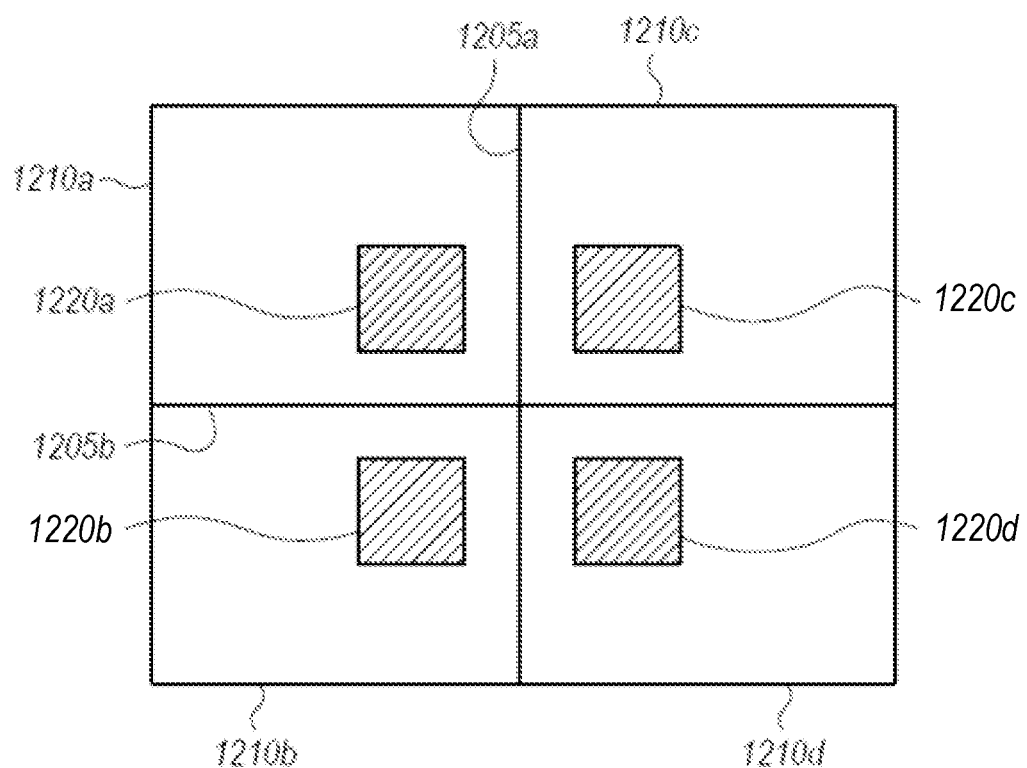
FIG. 12 illustrates an example circuit pattern with overlapping mask patterns according to an embodiment.

FIG. 12 illustrates an example circuit pattern with overlapping mask patterns according to an embodiment. The example shown in FIG. 12A has four polygons 1220a, 1220b, 1220c, and 1220d. For this example, each polygon center determines where the search window is placed to determine a circuit pattern. Since the distance between polygons is smaller than the size of a search window, these circuit patterns have significant overlap. For example, a circuit pattern determined based on a polygon 1220 may include all the remaining polygons 1220 shown in FIG. 12A or at least portions of the remaining polygons.

The mask design system 100 determines 1120 the mask patterns corresponding to each circuit pattern. For example, the mask may have been previously computed for the circuit design, and the mask design system 100 extracts the mask pattern as a portion of the mask corresponding to each circuit pattern.

The mask design system 100 partitions 1130 the portion of circuit design being processed into non-overlapping regions, using a medial axis between the geometric shapes of the circuit. The medial axis represents points between geometric shapes that have at least two closest points on the boundaries of the geometric shapes. Accordingly, each point on the medial axis is equidistant from at least two points on the boundaries of the geometric shapes that are closest to the point.

In an embodiment, the mask design system 100 generates a Voronoi diagram that partitions the circuit design into regions close to each of a given set of centers of polygons. The mask design system 100 may generate the Voronoi diagram by using an incremental technique that starts with an edge and expands the Voronoi diagram by adding edges. The mask design system 100 may use a divide and conquer technique that splits a region into multiple parts and determines Voronoi diagram of each part and then combines individual Voronoi diagrams. The mask design system 100 may use other techniques for determining the Voronoi diagram.

As shown in FIG. 12, the mask design system 100 partitions the circuit design using medial axes represented by lines 1205a and 1205b. The lines 1205 partition the design into regions close to each polygon center that was used to define the search window corresponding to the circuit pattern. Each non-overlapping region of the Voronoi diagram is associated with the polygon used to define the region. Accordingly, region 1210a is associated with polygon 1220a, region 1210b is associated with polygon 1220b, region 1210c is associated with polygon 1220c, and region 1210c is associated with polygon 1220c.

The mask design system 100 identifies the mask pattern for each circuit pattern corresponding to the search windows and determines 1140 the portion of the mask pattern within each region 1210. The mask design system 100 replaces the polygons of the mask pattern into the correct location in the circuit design with the correct geometric transformation, for example, rotation/translation/mirror from the master copy of the mask pattern.

Figure 13:
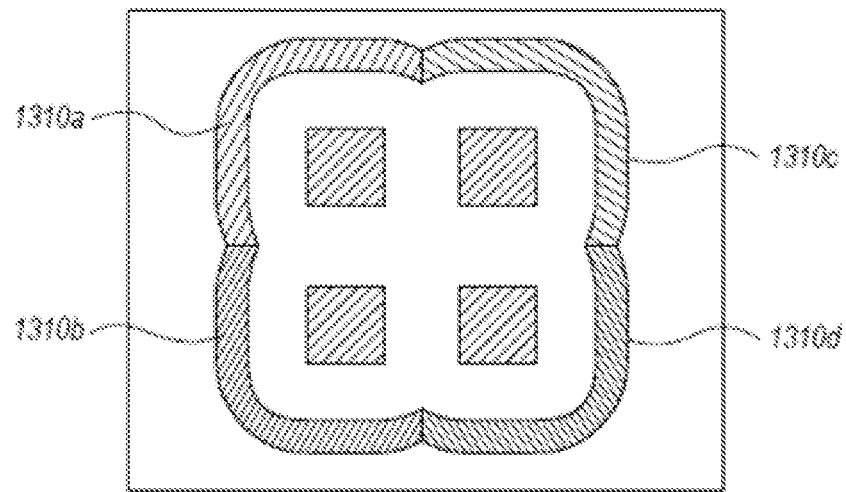
FIG. 13 illustrates an example circuit pattern obtained by replacing mask patterns into a correct location with the correct rotation/translation/mirroring from a master copy of the mask pattern according to an embodiment.

FIG. 13 illustrates an example circuit pattern obtained by replacing mask patterns into a correct location with the correct geometric transformation, for example, rotation/translation/mirroring from a master copy of the mask pattern according to an embodiment. The shapes 1310 denote mask pieces for each respective-owned region 1210 shown in FIG. 12. For example, the portion of the mask pattern for region 1210a is shown as 1310a, the portion of the mask pattern for region 1210b is shown as 1310b, the portion of the mask pattern for region 1210c is shown as 1310c, and the portion of the mask pattern for region 1210d is shown as 1310d.

The mask design system 100 identifies the portions of the mask where the mask pattern from one region connects with the mask pattern of another region at the region boundaries and modifies 1150 the mask patterns if necessary to ensure that the mask pattern is aligned at the region boundaries. For example, if the corners of the mask patterns do not align at the boundary of the regions, the mask design system 100 may stretch the polygons to ensure that the corners align.

Figure 14:
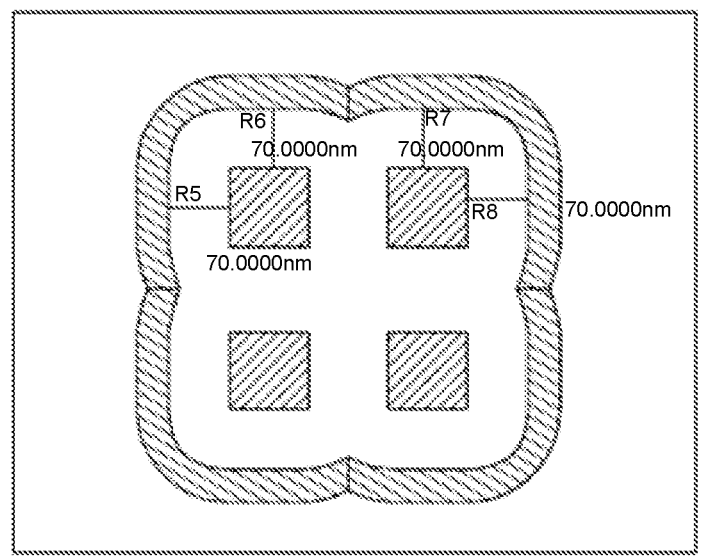
FIG. 14 shows the final, consistent, symmetric mask pattern with measurements which can be compared to the mask from FIG. 8A.

Alternatively, the mask design system 100 may add edges between the polygons to create a continuous geometric shape across regions. FIG. 14 show the final, consistent, symmetric solution of the mask with measurement which can be compared to the mask from FIG. 8.

Some embodiments use pixel based techniques to combine mask patterns across regions when there are mismatches at the boundaries. These embodiments perform blending at the boundaries of the regions through pixel based averaging and smoothing.

Figure 15:
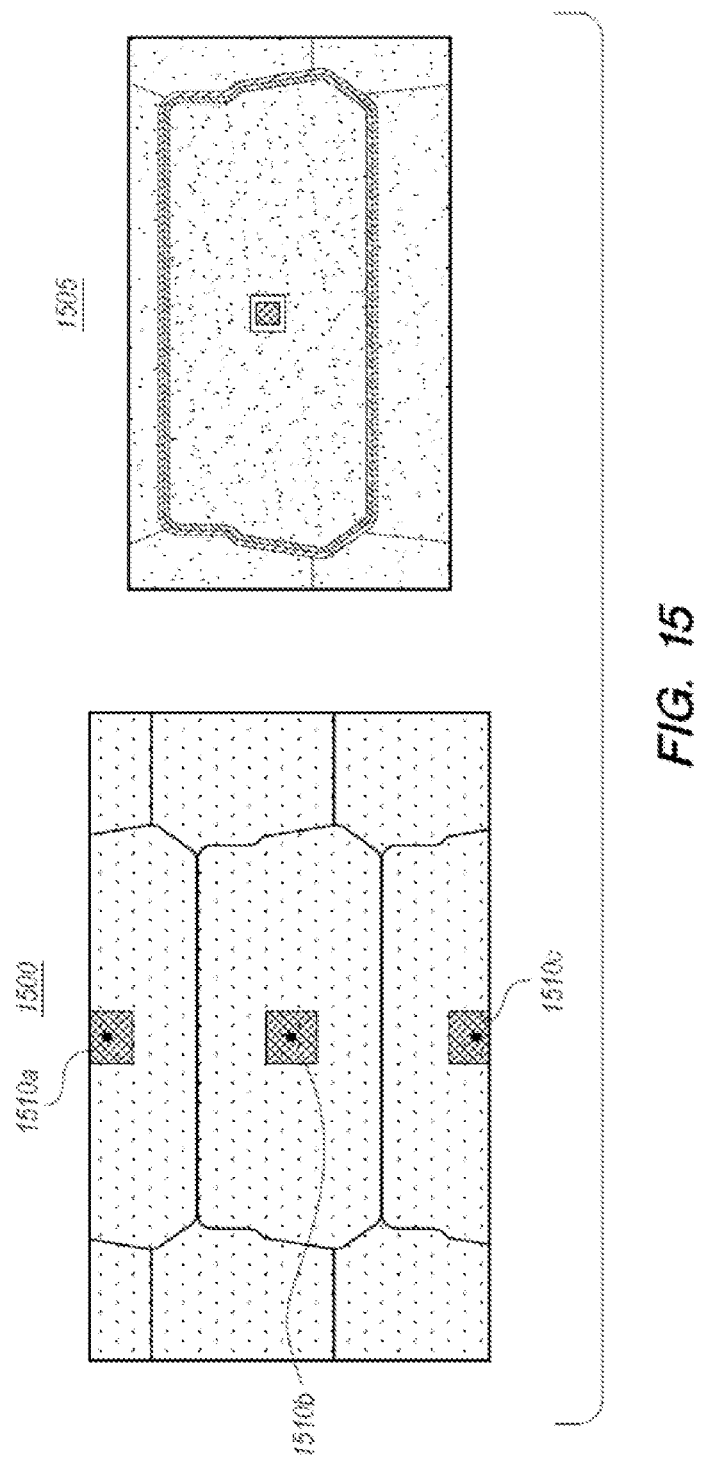
FIG. 15 shows an example illustrating pixel based blending of mask patterns according to an embodiment

FIG. 15 shows an example illustrating pixel based blending of mask solutions according to an embodiment. FIG. 15 shows a portion of circuit design 1500a including a set of design polygons 1510a, 1510b, 1510c with shaded regions on the left. The mask design 1505 on the right shows a transition weight field which is used to blend the averaged rasterized mask near the edges of the ownership region. The mask design system 100 uses the transition region to merge mismatches that occur at these region boundaries.

The mask design system 100 treats the regions of the circuit design as an image. The mask design system 100 initializes a background field corresponding to regions of the circuit design to a fixed value, for example, zero at all pixels. The mask design system 100, performs the following steps for each mask pattern being inserted into the circuit design.

(1) The mask design system 100 receives the mask that may represent an aggregate mask determines as described in connection with FIG. 10. (2) The mask design system 100 rasterizes the mask, i.e., converts the mask into a pixel representation, where the pixel value at a point depends on whether the mask is present or not present at the point. (3) The mask design system 100 multiplies the rasterized representation of the mask by the transition field for this particular region as shown in FIG. 15. (4) the mask design system 100 adds the product of the rasterized representation and the transition field determined in step (3) to the background mask. The final result is a combined mask solution which is consistent for each instance of a design geometry placement.

Blending Based Mask Placement

In an embodiment, the mask design system 100 uses a blending based mask placement method for combining mask patterns for a full circuit design that uses blending methods to smoothly combine the mask patterns from overlapping circuit patterns.

Figure 16:
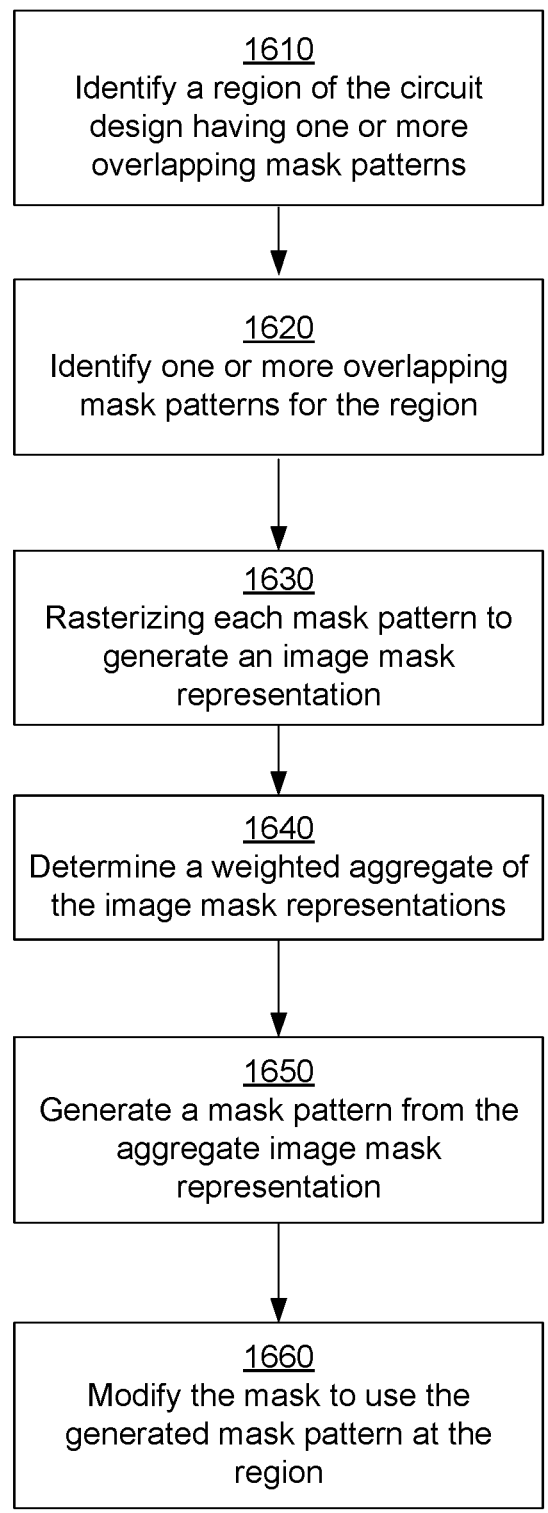
FIG. 16 shows a flowchart illustrating a process for combining mask patterns for a full circuit design using blending methods, according to an embodiment.

FIG. 16 shows a flowchart illustrating a process for combining mask patterns for a full circuit design using blending methods, according to an embodiment.

The mask design system 100 receives a circuit design and a mask design for the circuit design. The mask may have been generated using any known technique, for example, using the process illustrated in FIG. 3. The mask design system 100 identifies 1610 a region within the circuit design. The region may correspond to multiple overlapping circuit patterns. Accordingly, there are multiple mask patterns for the region, wherein at least some of the mask patterns are overlapping with other mask patterns.

Figure 17:
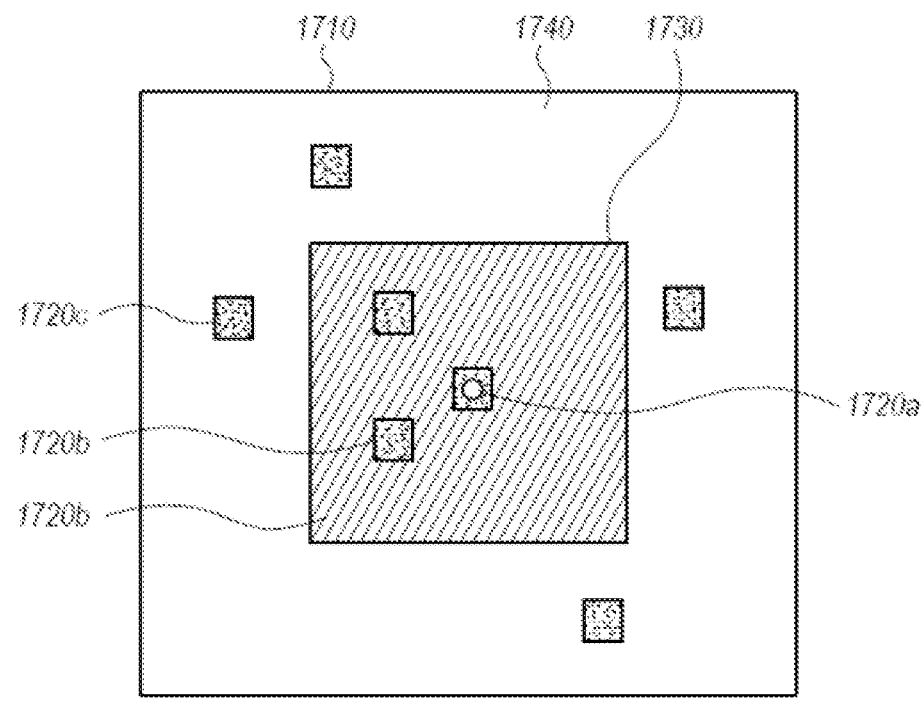
FIG. 17 shows an example of a circuit pattern representing a region of the circuit design according to an embodiment.

FIG. 17 shows an example of a circuit pattern representing a region of the circuit design according to an embodiment. The region includes one or more geometric shapes 1720. FIG. 11 shows a search window 1710 centered at the dot within the geometric shape 1720a. The mask design system 100 may generate a mask pattern based on the search window. There may be other search windows centered at points within the other geometric shapes in the region. Accordingly, multiple mask patterns may be generated that are overlapping within the region. The region includes a core sub-region 1730 and a portion outside the sub-region, referred to as the ambit sub-region 1740.

The mask design system 100 rasterizes 1630 each mask pattern to generate an image mask representation of the mask pattern. The mask pattern may use a vector representation of the geometric shapes. The mask design system 100 rasterizes 1630 the mask pattern to generate a pixelated representation of the mask pattern. Accordingly, the image mask representation for the region may be represented as an array of pixel values, for example, a two-dimensional array of pixel values. Each pixel may indicate whether the mask pattern has a geometric shape present or not present at that pixel location. For example, the pixel value may be 1 if the mask pattern has a geometric shape at that location and 0 if the mask pattern does not have a geometric shape at that location.

Figure 18:
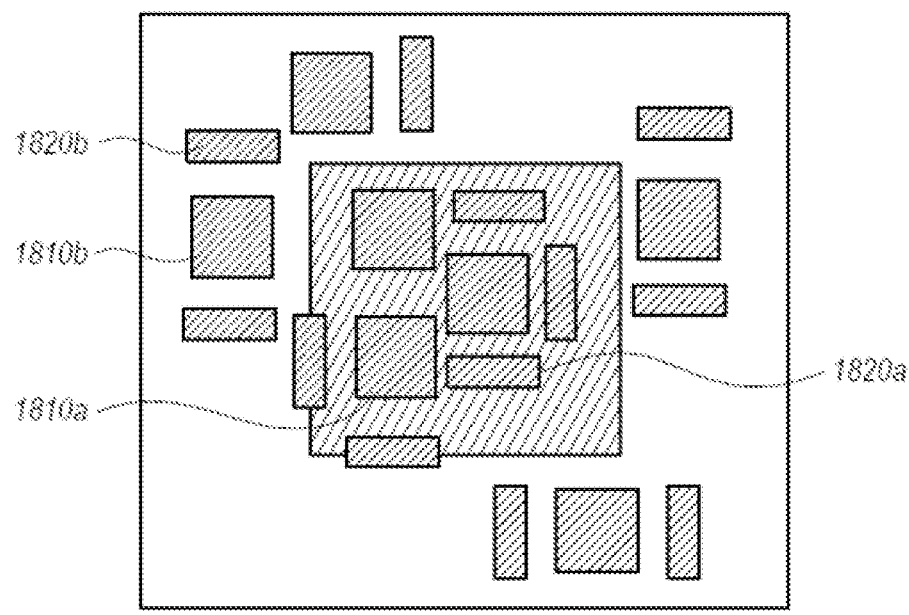
FIG. 18 shows an example mask pattern illustrating features and assist features of the mask in a region according to an embodiment.

A geometric shape of the mask pattern may represent a feature of the mask or an assist feature of the mask. The assist feature may not be located at the geometric shape of the circuit pattern but helps with fabrication of the geometric shape corresponding to the circuit pattern. FIG. 18 shows an example mask pattern illustrating features 1810 and assist features 1820 of the mask in a region according to an embodiment. The mask pattern illustrated in FIG. 18 is generated from the circuit pattern shown in FIG. 17. Some of the features and assist features are within the sub-region 1730 and some are in the ambit 1740. For example, feature 1810a and assist feature 1820a are within the core sub-region 1730 and feature 1810b and assist feature 1820b are within the ambit sub-region 1740.

The mask design system 100 uses a blending procedure that de-weights the portion of the mask pattern which is outside of the sub-region 1730, i.e., the portion within the ambit sub-region 1740. The mask design system 100 determines 1640 a weighted aggregate of the image mask representations to generate an aggregate image mask representation. The mask design system 100 weighs the pixels such that a pixel closer to the center of the region is weighted higher than a pixel at the periphery of the region. In an embodiment, the mask design system 100 uses a blending/weighting field which is equal to 1 in the center region and decays to 0 at the edge of the region.

Figure 19:
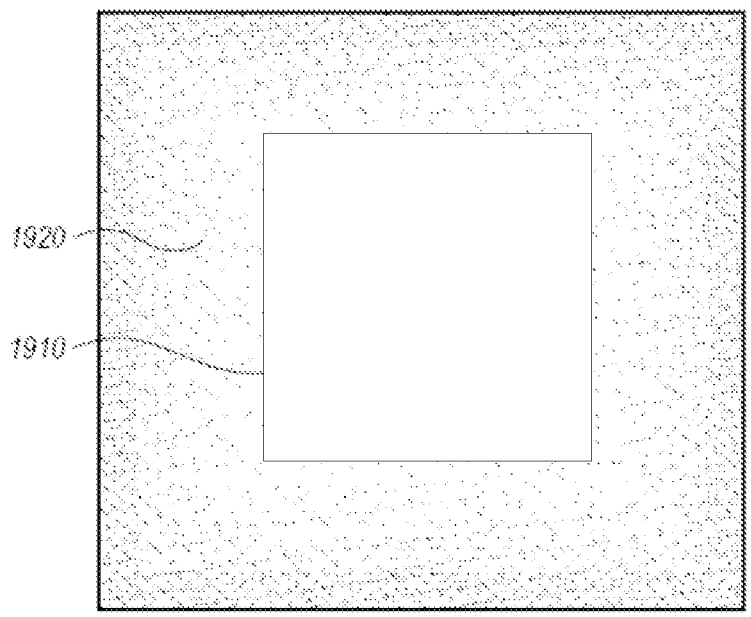
FIG. 19 depicts a blending region weighted higher at the center of the region and decaying towards the edge according to an embodiment.

FIG. 19 depicts a blending region weighted higher at the center of the region and decaying towards the edge according to an embodiment. For example, the weight in a portion 1910 that is within the core sub-region 1730 is 1 and the weight in a portion 1920 that is within the ambit sub-region 1740 gradually decreases with the distance from the edge of the core sub-region, for example, the weight decreasing to 0 at the outer edge of the ambit sub-region.

In an embodiment, the mask design system 100 initializes a background mask field to zero at all pixels corresponding to the region. The mask design system 100 determines a weighted pixel value for each mask by multiplying the pixel values of the image mask representation by the blending/weighting field as illustrated in FIG. 19. The mask design system 100 adds the weighted pixel values for the mask representations corresponding to the region.

The mask design system 100 generates 1650 a mask pattern from the aggregate image mask representation by converting the pixel representation to a vector representation.

The final step will be to extract the mask polygons from the background mask field. For this step we can normalize the mask at each pixel by how many unique masks contributed to that pixel (essentially doing averaging), then we can extract the contour at the mid-level height of 0.5 which should represent the edge of the rasterized mask.

The mask design system 100 performs such weighting so that the features of the mask pattern closer to the edge of the region are less valid for the design in the center since they were potentially created with empty design outside of the region, which is not an accurate representation of what the circuit design was outside the box. Thus, the mask design system 100 only keeps the full mask pattern in the center of the window where it is likely to be most accurate. The blending allows the mask design system 100 to smoothly combine mask patterns from neighboring, overlapping windows.

Figure 20:
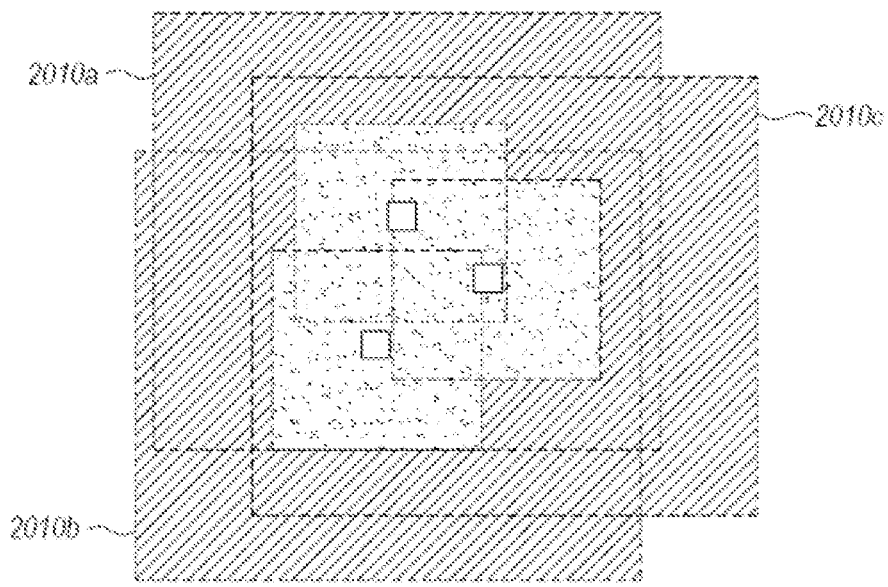
FIG. 20 illustrates overlapping regions created by search windows centered at three nearby geometric shapes of the circuit design according to an embodiment.

FIG. 20 illustrates overlapping regions created by search windows centered at three nearby geometric shapes of the circuit design. As illustrated in FIG. 10, the mask design system 100 performs aggregating of the mask near the center of the regions for three masks 2010a, 2010b, and 2010c. In contrast, at the edges of the regions, the mask design system 100 performs only averaging over a single mask pattern corresponding to the polygon of the circuit design that is closest to that part of the region. The mask design system 100 divides sum of the pixel value at each location by the number of mask patterns that contributed to the pixel value to normalize the pixel value.

The mask design system 100 modifies 1660 the mask design to use the generated mask pattern for the region 1710 of the circuit design. Accordingly, the mask design system 100 generates the mask for the full circuit design by combining the mask patterns generated for different regions based on the process illustrated in FIG. 16.

Offset Representation of Mask Features

In some embodiments, the mask design system 100 stores the feature of a mask as an offset of the edge of a geometric shape of the circuit design. Such representation may be used for optimal proximity correction (OPC). The mask design system 100 may store multiple local offsets of a mask for OPC, in which case the offset may be defined multiple times for a given location. In this case the method described in section 3.3.1 will not be applicable as the mask is not a polygon.

Figure 21A:
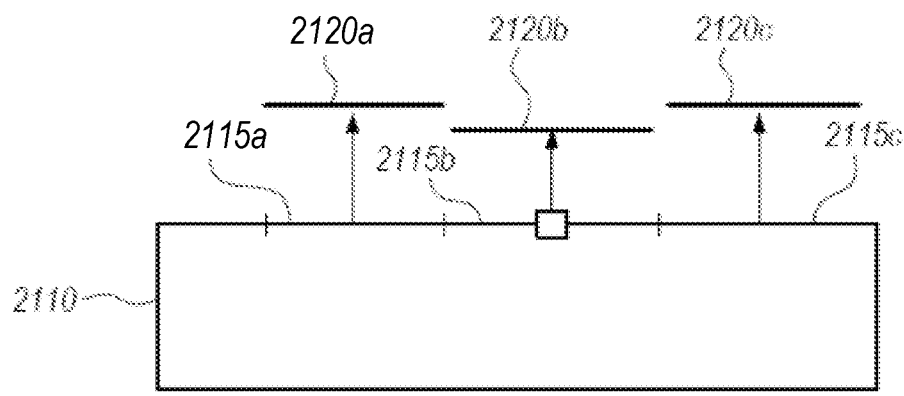
FIG. 21A shows a polygon in with some subedges and their offsets according to an embodiment.

FIG. 21A shows a polygon 2110 with some subedges 2115 and their offsets 2120. There are three subedges 2115a, 2115*b*, and 2115*c* and corresponding offsets 2120*a*, 2120*b*, and 2120*c*. The offset value represents the distance along the normal direction that the mask edge should be offset from the circuit design edge. The mask design system 100 executes an OPC process to determine the offsets 2120 with respect to an edge of a polygon of the circuit design. The three offsets 2120*a*, 2120*b*, and 2120*c* are determined using the subedge 2115*b*.

Figure 21B:
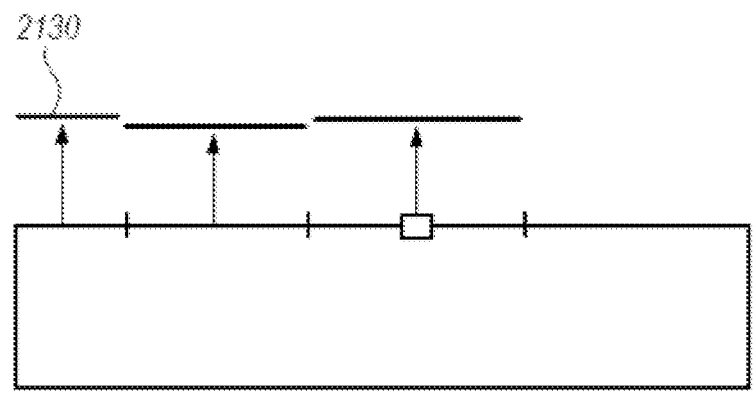
FIG. 21B shows an alternate result of offsets generated as result of a different subedge according to an embodiment.
Figure 21C:
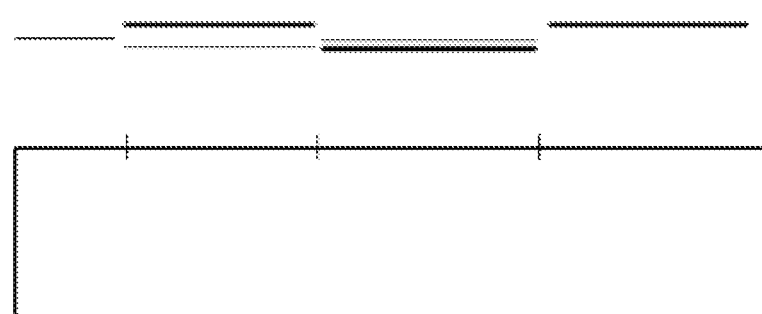
FIG. 21C shows overlay of these two offset results shown in FIGS. 21A and 21B according to an embodiment.

The mask design system 100 may generate multiple sets of offsets based on the geometric shape of the circuit design. FIG. 21B shows an alternate result of offsets 2130 generated from the edge of the circuit design. The mask design system 100 resolves these offsets to generate a single consistent mask. FIG. 21C shows overlay of these two offset results shown in FIGS. 21A and 21B.

The offset results may not be identical for the two subedges. The mask design system 100 selects a unique answer for the offsets. The mask design system 100 selects an aggregate value based on the offsets, for example, an average, minimum, maximum, median, or any other aggregate function of the candidate offsets at a given location.

Assist Feature Offset Representation

The mechanism shown to combine offsets can be used for combining assist features. The mask design system 100 allows the offset to be multivalued, with each value representing an additional assist feature placement beyond the main feature, or inside the main feature.

Figure 22:
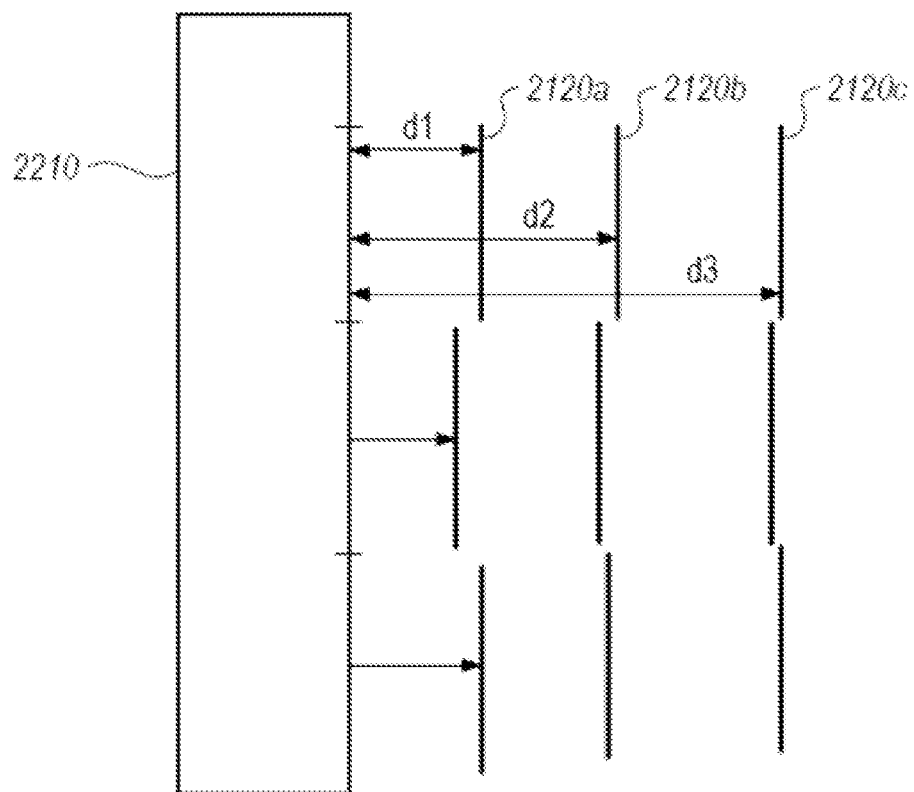
FIG. 22 illustrates implementing assist feature centers as a generalization of the OPC offset, according to an embodiment.

FIG. 22 illustrates implementing assist feature centers as a generalization of the OPC offset, according to an embodiment. FIG. 22 shows a polygon 2210 with assist feature 2120*a*, 2120*b*, 2120*c* at distances d1, d2, d3 representing the multivalued offset distance from the design for three assist features. The mask design system 100 aggregates the offsets for edge segments that have multiple assist feature solutions in a similar way as the OPC offsets described in connection with FIG. 21.

As assist features can overlap in space when they are placed as offset from different nearby designs, the mask design system 100 uses the Voronoi diagram to make regions and thus only compute averages for assist features within the same region as the design point which is being offset and place assist feature after they have been aggregated in this region.

Figure 23:
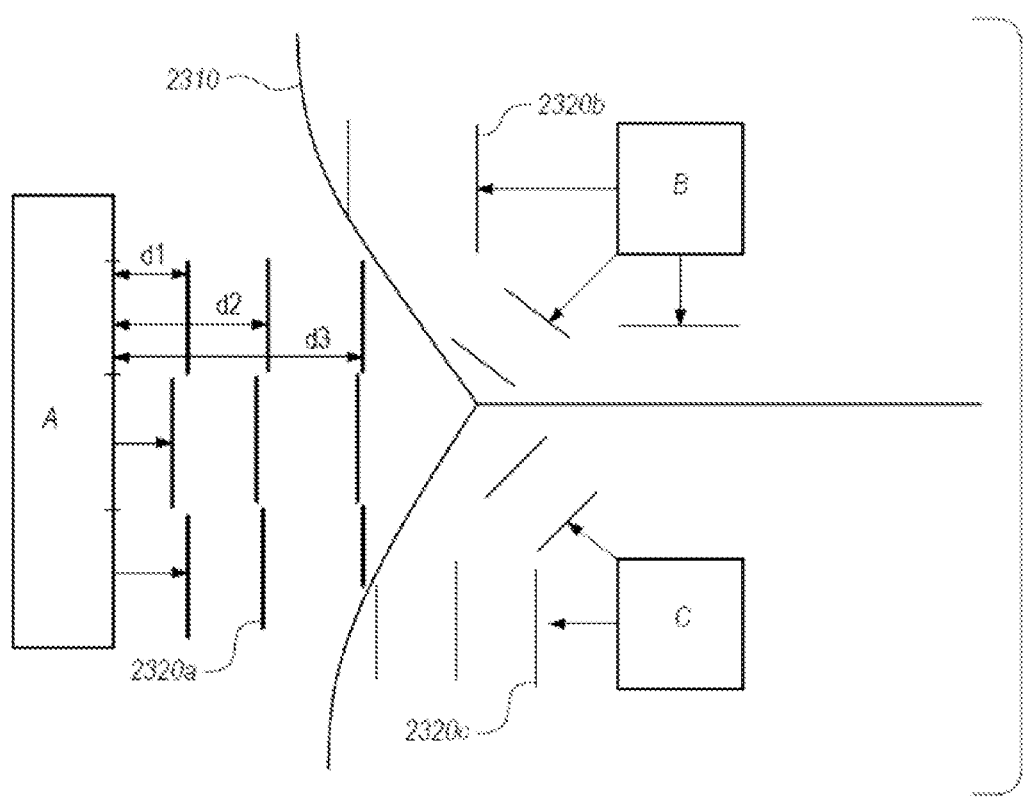
FIG. 23 depicts three nearby design polygons and a Voronoi boundary according to an embodiment.

FIG. 23 depicts three nearby design polygons and a Voronoi boundary 2310 according to an embodiment. Assist features 2320*a* correspond to polygon A, assist features 2320*b* correspond to polygon B, and assist features 2320*c* correspond to polygon C.

Figure 24:
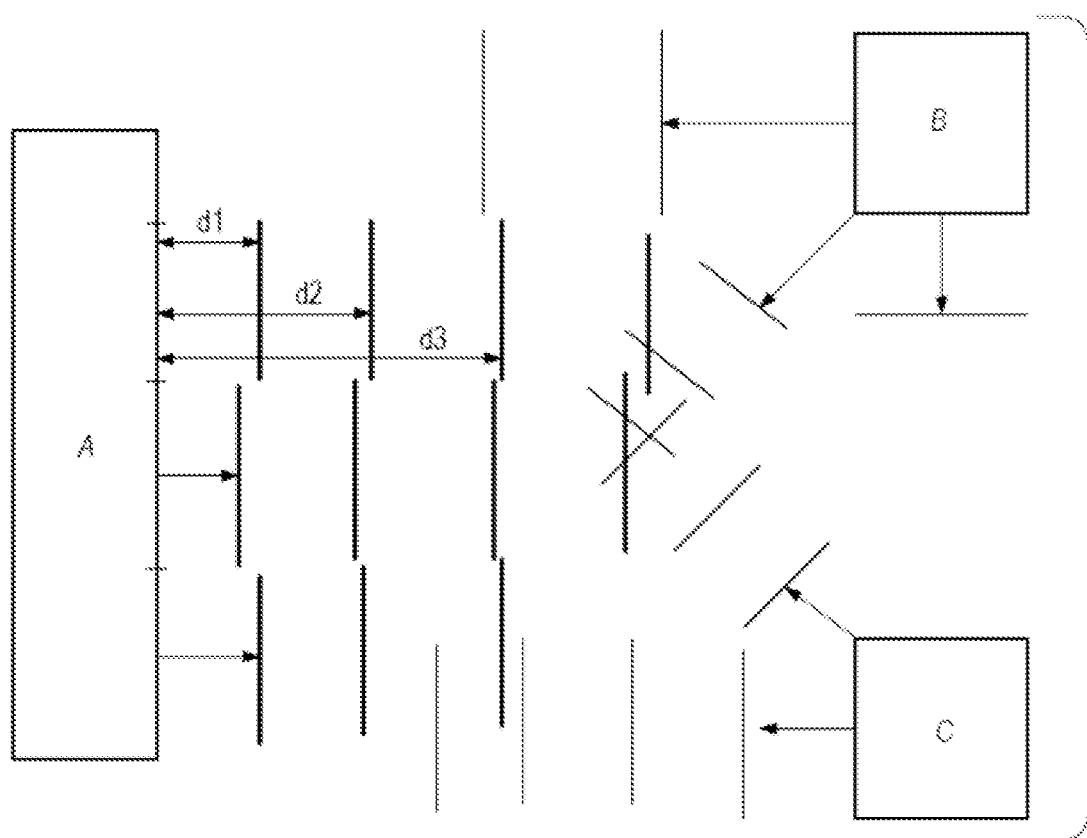
FIG. 24 depicts how some assist features extend into another region and overlap with other assist features if the mask design system did not limit them to the Voronoi boundary.

FIG. 24 depicts how some assist features would extend into another region and overlap with other assist features if the mask design system did not limit them to the Voronoi boundary. This would have made a more complicated conflict resolution scenario which the mask design system 100 avoids by restricting the assist features to their own region using Voronoi diagram.

Electronic Design Automation Process

Figure 25:
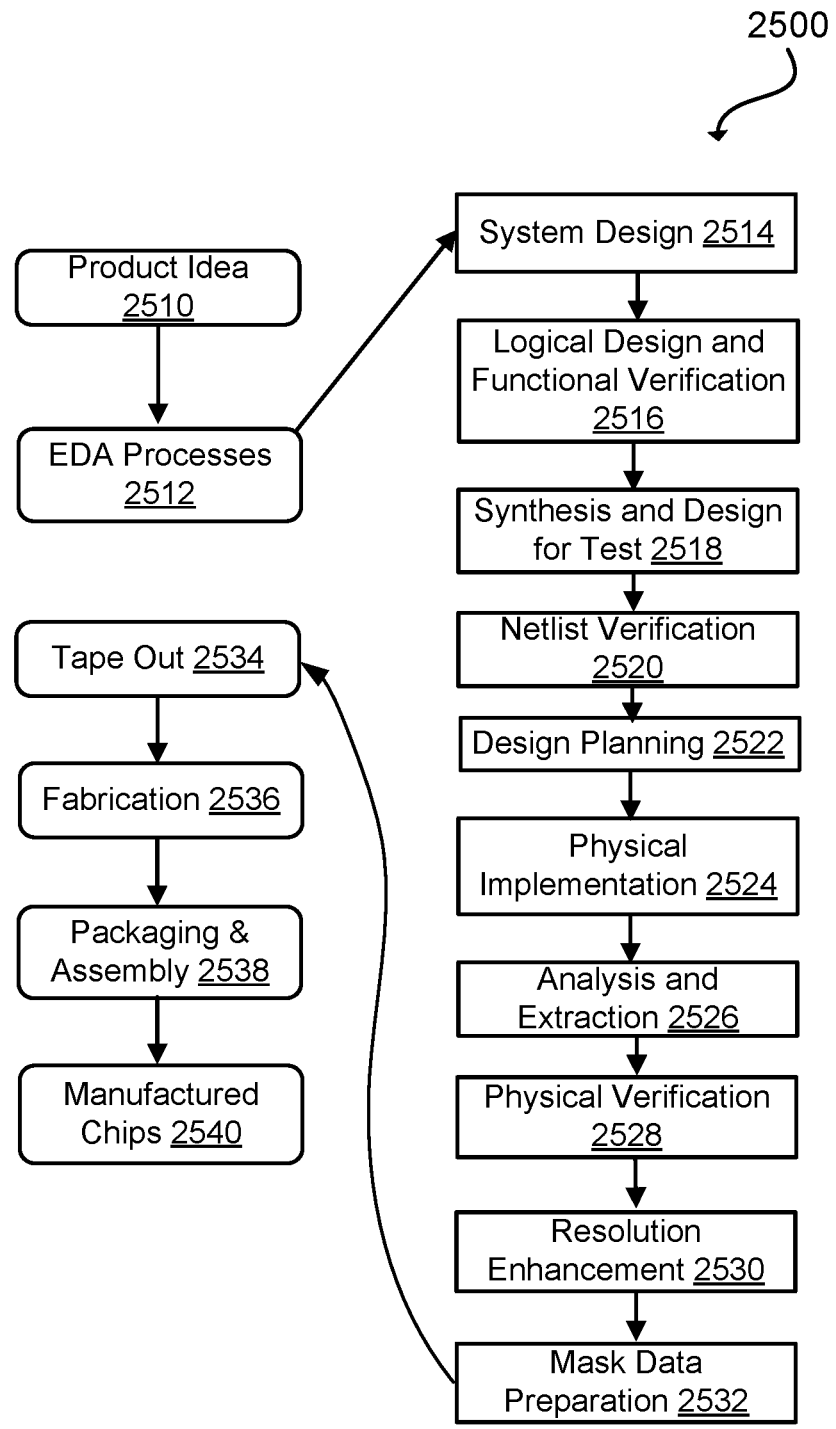
FIG. 25 depicts a flowchart of various processes used during the design and manufacture of an integrated circuit in accordance with some embodiments.

FIG. 25 illustrates an example set of processes 2500 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 2510 with information supplied by a designer, information which is transformed to create an article of manufacture that uses a set of EDA processes 2512. When the design is finalized, the design is taped-out 2534, which is when artwork (e.g., geometric patterns) for the integrated circuit is sent to a fabrication facility to manufacture the mask set, which is then used to manufacture the integrated circuit. After tape-out, a semiconductor die is fabricated 2536 and packaging and assembly processes 2538 are performed to produce the finished integrated circuit 2540.

Specifications for a circuit or electronic structure may range from low-level transistor material layouts to high-level description languages. A high-level of abstraction may be used to design circuits and systems, using a hardware description language ('EIDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 25. The processes described by be enabled by EDA products (or tools).

During system design 2514, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 2516, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 2518, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 2520, the netlist is checked for compliance with timing constraints and for correspondence with the HDL code. During design planning 2522, an overall floor plan for the integrated circuit is constructed and analyzed for timing and top-level routing.

During layout or physical implementation 2524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 2526, the circuit function is verified at the layout level, which permits refinement of the layout design. During physical verification 2528, the layout design is checked to ensure that manufacturing constraints are correct, such as DRC constraints, electrical constraints, lithographic constraints, and that circuitry function matches the HDL design specification. During resolution enhancement 2530, the geometry of the layout is transformed to improve how the circuit design is manufactured.

During tape-out, data is created to be used (after lithographic enhancements are applied if appropriate) for production of lithography masks. During mask data preparation 2532, the 'tape-out' data is used to produce lithography masks that are used to produce finished integrated circuits.

A storage subsystem of a computer system (such as computer system 900 of FIG. 9, or host system 807 of FIG. 8) may be used to store the programs and data structures that are used by some or all of the EDA products described herein, and products used for development of cells for the library and for physical and logical design that use the library.

Embodiments can be used for processing the circuit designs during various stages of the electronic design automation process that store the circuit layout, for example, layout or physical implementation 2524, analysis and extraction 2526, mask data preparation 2532, and so on.

Computer Architecture

Figure 26:
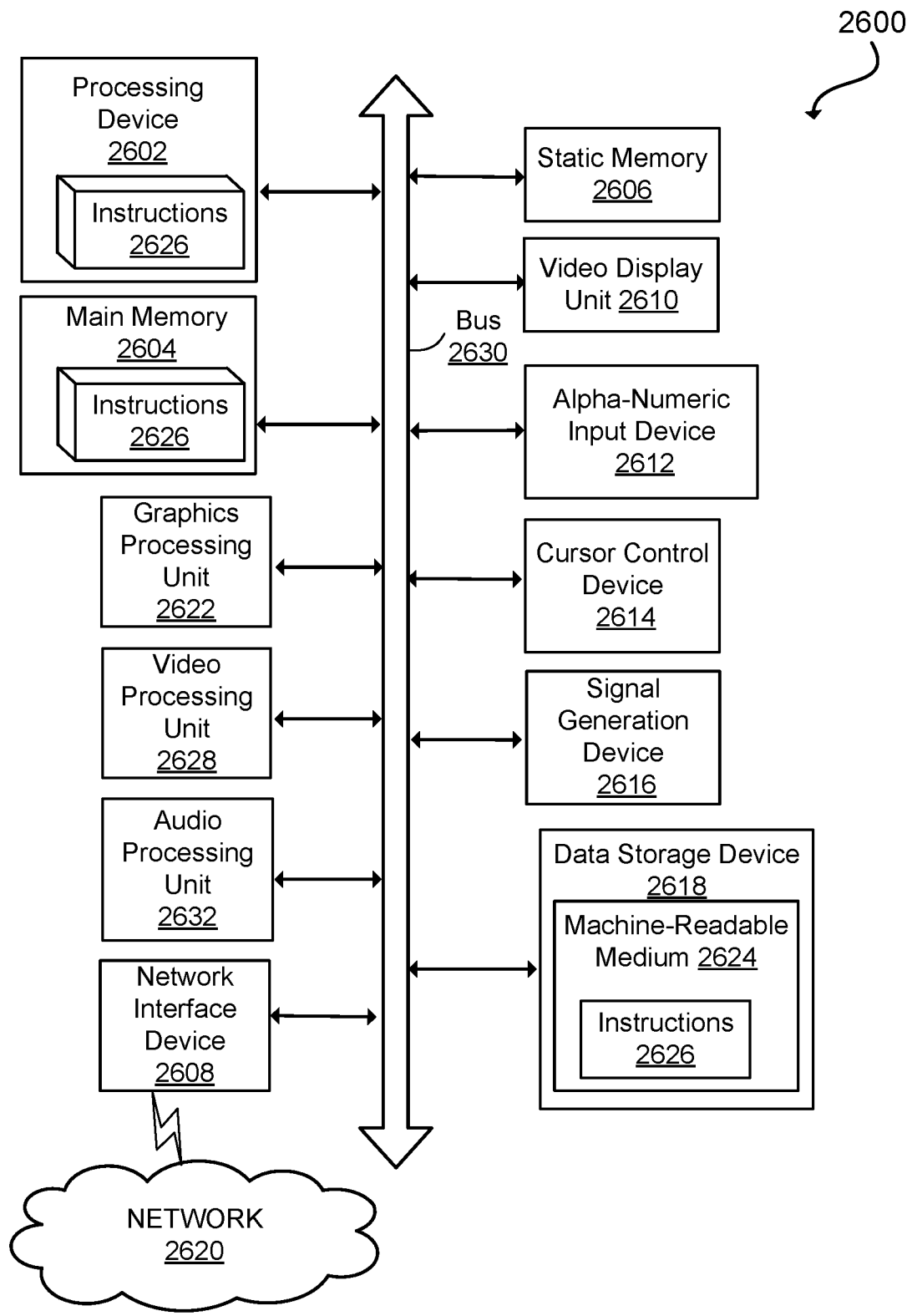
FIG. 26 depicts an abstract diagram of an example computer system in which embodiments may operate.

FIG. 26 illustrates an example machine of a computer system 2600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 2600 includes a processing device 2602, a main memory 2604 (e.g., read-only memory (ROM), flash memory, dynamic random access memory (DRAM) such as synchronous DRAM (SDRAM), a static memory 2606 (e.g., flash memory, static random access memory (SRAM), etc.), and a data storage device 2618, which communicate with each other via a bus 2630.

Processing device 2602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 2602 may also be one or more special-purpose processing devices such as an application specific integrated circuit (ASIC), a field programmable gate array (FPGA), a digital signal processor (DSP), network processor, or the like. The processing device 2602 may be configured to execute instructions 2626 for performing the operations and steps described herein.

The computer system 2600 may further include a network interface device 2608 to communicate over the network 2620. The computer system 2600 also may include a video display unit 2610 (e.g., a liquid crystal display (LCD) or a cathode ray tube (CRT)), an alphanumeric input device 2612 (e.g., a keyboard), a cursor control device 2614 (e.g., a mouse), a graphics processing unit 2622, a signal generation device 2616 (e.g., a speaker), graphics processing unit 2622, video processing unit 2628, and audio processing unit 2632.

The data storage device 2618 may include a machine-readable storage medium 2624 (also known as a non-transitory computer-readable medium) on which is stored one or more sets of instructions 2626 or software embodying any one or more of the methodologies or functions described herein. The instructions 2626 may also reside, completely or at least partially, within the main memory 2604 and/or within the processing device 2602 during execution thereof by the computer system 2600, the main memory 2604 and the processing device 2602 also constituting machine-readable storage media.

In some implementations, the instructions 2626 include instructions to implement functionality corresponding to the present disclosure. While the machine-readable storage medium 2624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 2602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method to perform mask synthesis for a circuit design, the method comprising:

receiving the circuit design representing a physical layout of a circuit, the circuit design comprising geometric shapes;

identifying a region within the circuit design;

identifying a plurality of mask patterns for the region, wherein at least some of the plurality of mask patterns are overlapping, each mask pattern using a vector representation of geometric shapes;

generating a plurality of image mask representations comprising, for each mask pattern from the plurality of mask patterns, rasterizing the mask pattern to generate an image mask representation comprising a plurality of pixel values;

determining a weighted aggregate of the plurality of image mask representations to generate an aggregate image mask representation, wherein a pixel value closer to center of the region is weighted higher than a pixel value far from the center of the region; and generating, by a processing device, an aggregate mask pattern from the aggregate image mask representation.

2. The method of claim 1, further comprising:

modifying a mask design for the circuit design to use the aggregate mask pattern for the region of the circuit design.

3. The method of claim 1, further comprising:

determining a plurality of regions within the circuit design using a medial axis such that the regions of the plurality of regions are non-overlapping.

4. The method of claim 1, wherein the region comprises a core region including the center of the region, wherein the weight of all pixel values in the core region is identical.

5. The method of claim 4, wherein the region further comprises an ambit region surrounding a core region, wherein the weight of pixel values in the ambit region decreases from an edge of the core region to an edge of the region.

6. The method of claim 1, wherein determining a weighted aggregate of the plurality of image mask representations to generate an aggregate image mask representation comprises averaging weighted pixel values of the rasterized mask patterns.

7. The method of claim 1, wherein determining a weighted aggregate of the plurality of image mask representations to generate an aggregate image mask representation comprises generating a vector representation of a mask pattern.

8. A non-transitory computer readable storage medium storing instructions to perform mask synthesis for a circuit design, the instructions when executed by one or more computer processors cause the one or more computer processors to:

receive the circuit design representing a physical layout of a circuit, the circuit design comprising geometric shapes;

identify a region within the circuit design;

identify a plurality of mask patterns for the region, wherein at least some of the plurality of mask patterns are overlapping, each mask pattern using a vector representation of geometric shapes;

generate a plurality of image mask representations by causing the one or more computer processors to, for each mask pattern from the plurality of mask patterns, rasterize the mask pattern to generate an image mask representation comprising a plurality of pixel values;

determine a weighted aggregate of the plurality of image mask representations to generate an aggregate image mask representation, wherein a pixel value closer to center of the region is weighted higher than a pixel value far from the center of the region; and generate an aggregate mask pattern from the aggregate image mask representation.

9. The non-transitory computer readable storage medium of claim 8, wherein instructions to determine the aggregate mask pattern cause the one or more computer processors to:

modify a mask design for the circuit design to use the aggregate mask pattern for the region of the circuit design.

10. The non-transitory computer readable storage medium of claim 8, wherein instructions to determine the aggregate mask pattern cause the one or more computer processors to:

determine a plurality of regions within the circuit design using a medial axis such that the regions of the plurality of regions are non-overlapping.

11. The non-transitory computer readable storage medium of claim 8, wherein the region comprises a core region including the center of the region, wherein the weight of all pixel values in the core region is identical.

12. The non-transitory computer readable storage medium of claim 11, wherein the region further comprises an ambit region surrounding a core region, wherein the weight of pixel values in the ambit region decreases from an edge of the core region to an edge of the region.

13. The non-transitory computer readable storage medium of claim 8, wherein determining a weighted aggregate of the plurality of image mask representations to generate an aggregate image mask representation comprises averaging weighted pixel values of the rasterized mask patterns.

14. The non-transitory computer readable storage medium of claim 8, wherein determining a weighted aggregate of the plurality of image mask representations to generate an aggregate image mask representation comprises generating a vector representation of a mask pattern.

15. A computer system comprising:

one or more computer processors; and a non-transitory computer readable storage medium storing instructions to perform mask synthesis for a circuit design, the instructions when executed by the one or more computer processors cause the one or more computer processors to:

receive the circuit design representing a physical layout of a circuit, the circuit design comprising geometric shapes;

identify a region within the circuit design;

identify a plurality of mask patterns for the region, wherein at least some of the plurality of mask patterns are overlapping, each mask pattern using a vector representation of geometric shapes;

generate a plurality of image mask representations by causing the one or more computer processors to, for each mask pattern from the plurality of mask patterns, rasterize the mask pattern to generate an image mask representation comprising a plurality of pixel values;

determine a weighted aggregate of the plurality of image mask representations to generate an aggregate image mask representation, wherein a pixel value closer to center of the region is weighted higher than a pixel value far from the center of the region; and generate an aggregate mask pattern from the aggregate image mask representation.

16. The computer system of claim 15, wherein instructions to determine the aggregate mask pattern cause the one or more computer processors to:

modify a mask design for the circuit design to use the aggregate mask pattern for the region of the circuit design.

17. The computer system of claim 15, wherein instructions to determine the aggregate mask pattern cause the one or more computer processors to:

determine a plurality of regions within the circuit design using a medial axis such that the regions of the plurality of regions are non-overlapping.

18. The computer system of claim 15, wherein the region comprises a core region including the center of the region, wherein the weight of all pixel values in the core region is identical.

19. The computer system of claim 18, wherein the region further comprises an ambit region surrounding a core region, wherein the weight of pixel values in the ambit region decreases from an edge of the core region to an edge of the region.

20. The computer system of claim 15, wherein determining a weighted aggregate of the plurality of image mask representations to generate an aggregate image mask representation comprises averaging weighted pixel values of the rasterized mask patterns.

* * * * *